United States Patent
Leng et al.

(10) Patent No.: US 12,363,250 B2
(45) Date of Patent: Jul. 15, 2025

(54) VIDEO PROCESSING METHOD AND APPARATUS, AND STORAGE MEDIA, USING VIRTUAL CAMERA BASED ON HARDWARE PARAMETER OF A PHYSICAL CAMERA

(71) Applicant: HUAWEI TECHNOLOGIES CO., LTD., Guangdong (CN)

(72) Inventors: Ye Leng, Shanghai (CN); Kerong Feng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 18/253,204

(22) PCT Filed: Nov. 16, 2021

(86) PCT No.: PCT/CN2021/130989
§ 371 (c)(1),
(2) Date: May 16, 2023

(87) PCT Pub. No.: WO2022/105759
PCT Pub. Date: May 27, 2022

(65) Prior Publication Data
US 2024/0007583 A1  Jan. 4, 2024

(30) Foreign Application Priority Data

Nov. 20, 2020 (CN) .......................... 202011309139.6

(51) Int. Cl.
*H04N 5/262* (2006.01)
*H04N 5/265* (2006.01)
(Continued)

(52) U.S. Cl.
CPC ............ *H04N 5/2624* (2013.01); *H04N 5/77* (2013.01); *H04N 21/21805* (2013.01);
(Continued)

(58) Field of Classification Search
CPC .... H04N 5/2624; H04N 5/2628; H04N 5/265; H04N 5/77; H04N 21/21805;
(Continued)

(56) References Cited

U.S. PATENT DOCUMENTS

2016/0134803 A1* 5/2016 Deng ................... H04N 23/631
  348/222.1
2023/0022153 A1* 1/2023 Jiang ...................... H04N 23/90

FOREIGN PATENT DOCUMENTS

CN  106161991 A    11/2016
CN  111083364 A *  4/2020 ............. H04N 23/60
(Continued)

*Primary Examiner* — Twyler L Haskins
*Assistant Examiner* — Akshay Trehan

(57) ABSTRACT

A method includes: When detecting preview requests for a plurality of cameras, a first device creates views and buffers that correspond to the plurality of cameras in a camera Android application package APK, delivers the buffers corresponding to the views to a framework FWK layer, and obtains camera data streams corresponding to the plurality of cameras from a hardware abstraction layer HAL through the FWK layer; and the first device renders the plurality of camera data streams to the corresponding buffers respectively through a layer transferring module of the FWK layer. The camera data streams of the plurality of cameras are carried and displayed by using the plurality of views, and the plurality of camera data streams are rendered to the buffers of the corresponding views through the layer transferring module, so as to implement quick preview.

15 Claims, 11 Drawing Sheets

(51) Int. Cl.
  *H04N 5/77* (2006.01)
  *H04N 21/218* (2011.01)
  *H04N 21/2187* (2011.01)
  *H04N 21/236* (2011.01)
  *H04N 21/4223* (2011.01)
  *H04N 21/44* (2011.01)
  *H04N 21/443* (2011.01)
  *H04N 23/45* (2023.01)
  *H04N 23/617* (2023.01)
  *H04N 23/63* (2023.01)
  *H04N 23/65* (2023.01)
  *H04N 23/661* (2023.01)
  *H04N 23/90* (2023.01)

(52) U.S. Cl.
  CPC ....... *H04N 21/2187* (2013.01); *H04N 21/236* (2013.01); *H04N 21/4223* (2013.01); *H04N 21/44012* (2013.01); *H04N 21/4431* (2013.01); *H04N 23/45* (2023.01); *H04N 23/617* (2023.01); *H04N 23/63* (2023.01); *H04N 23/632* (2023.01); *H04N 23/661* (2023.01); *H04N 23/662* (2023.01); *H04N 23/90* (2023.01); *H04N 5/265* (2013.01); *H04N 23/65* (2023.01)

(58) Field of Classification Search
  CPC ............. H04N 21/2187; H04N 21/236; H04N 21/4223; H04N 21/44012; H04N 21/4431; H04N 23/45; H04N 23/90; H04N 23/617; H04N 23/62; H04N 23/63; H04N 23/631; H04N 23/632; H04N 23/66; H04N 23/661; H04N 23/662; H04N 23/65; H04N 23/651
  See application file for complete search history.

(56) References Cited

FOREIGN PATENT DOCUMENTS

| CN | 111510678 A | * | 8/2020 | ........... G06T 3/4038 |
| EP | 2924563 A1 | | 9/2015 | |
| WO | WO-2020107040 A2 | * | 5/2020 | ........... H04L 67/125 |

* cited by examiner

VIDEO PROCESSING METHOD AND APPARATUS, AND STORAGE MEDIA, USING VIRTUAL CAMERA BASED ON HARDWARE PARAMETER OF A PHYSICAL CAMERA

CROSS-REFERENCE TO RELATED APPLICATIONS

This application is a National Stage of International Application No. PCT/CN2021/130989, filed on Nov. 16, 2021, which claims priority to Chinese Patent Application No. 202011309139.6, filed on Nov. 20, 2020. Both of the aforementioned applications are hereby incorporated by reference in their entireties.

TECHNICAL FIELD

This application relates to the field of electronic device technologies, and in particular, to a video processing method and apparatus, and a storage medium.

BACKGROUND

With development of science and technology, electronic devices have become one of the most frequently used electronic products in people's daily life. A plurality of cameras are configured on some electronic devices. For example, a front-facing camera and one or more rear-facing cameras may be configured on a mobile phone. A user usually takes a picture or a video by using an electronic device. Therefore, currently, a manner of processing multimedia data by an electronic device is very important.

SUMMARY

In view of this, a video processing method and apparatus are provided, where camera data streams of a plurality of cameras are carried and displayed by using a plurality of views, and the plurality of camera data streams are rendered to buffers of corresponding views by using a layer transferring module. This is more efficient than a related technology in which a plurality of camera data streams are synthesized and rendered to one view by using OpenGL at an APK layer.

According to a first aspect, an embodiment of this application provides a video processing method. The method is applied to a first device, and the method includes:

When detecting preview requests for a plurality of cameras, the first device creates views and buffers that correspond to the plurality of cameras in a camera Android application package APK, delivers the buffers corresponding to the views to a framework FWK layer, and obtains camera data streams corresponding to the plurality of cameras from a hardware abstraction layer HAL through the FWK layer; and the first device renders the plurality of camera data streams to the corresponding buffers respectively through a layer transferring module of the FWK layer, to preview the views corresponding to the camera data streams.

According to the video processing method in this application, when the preview requests for the plurality of cameras are detected, the views and the buffers that correspond to the plurality of cameras are created in the camera APK, the plurality of camera data streams are obtained from the camera HAL through the FWK layer, and the obtained plurality of camera data streams are rendered to the corresponding buffers obtained from the camera APK through the layer transferring module of a native layer (the FWK layer), so that the plurality of camera data streams are transmitted to the plurality of views of the camera APK, so as to rapidly implement multi-camera preview. This is more efficient than a related technology in which a plurality of camera data streams are synthesized and rendered to one view by using OpenGL at an APK layer.

With reference to a first possible implementation of the first aspect, the first device includes a virtual camera, and the method further includes:

The first device obtains a hardware parameter of a physical camera on a second device by using a distributed mobile sensing development platform DMSDP service; and the first device locally configures a corresponding virtual camera based on the hardware parameter of the physical camera.

With reference to the first possible implementation of the first aspect, in a second possible implementation, the hardware parameter includes a camera capability parameter of the physical camera; and that the first device locally configures a corresponding virtual camera based on the hardware parameter of the physical camera includes:

The first device creates, based on the camera capability parameter, a virtual camera hardware abstraction layer HAL and a camera framework that correspond to the physical camera, and adds the camera framework to a distributed camera framework, where the virtual camera HAL is located at the HAL, and the distributed camera framework is located at the FWK layer.

The DMSDP service is established between the first device and the second device, and the virtual camera HAL of the physical camera of the second device is locally established on the first device, to simulate real internet service provider (Internet Service Provider, ISP) control, so as to implement cross-device camera commands and data. Therefore, quick control of a distributed camera may be implemented.

With reference to the first or second possible implementation of the first aspect, in a third possible implementation, that the first device obtains camera data streams corresponding to the plurality of cameras from an HAL through the FWK layer when detecting preview requests for a plurality of cameras includes:

when the first device detects the preview requests, if the plurality of cameras include a virtual camera, the first device sends, by using the DMSDP service, a control command to a physical camera corresponding to the virtual camera, where the control command is used for controlling the physical camera to capture a current image; and the first device receives, by using the DMSDP service, a camera data stream returned by the physical camera in response to the control command, where the camera data stream includes the current image.

In a distributed camera scenario, according to the video processing method in the foregoing implementation of this application, the first device undertakes and displays the camera data streams of the plurality of cameras by using the plurality of views, obtains the plurality of camera data streams from the virtual camera HAL through the FWK layer, and renders, through the layer transferring module of the native layer (the FWK layer), the obtained plurality of camera data streams to the corresponding buffers obtained from the camera APK, so that the plurality of camera data streams are transmitted to the plurality of views of the camera APK, and preview results are quickly generated. Quick preview can be implemented when a service or experience is completed under multi-device collaboration, and camera data of a plurality of devices is synchronously recorded. Power consumption of a single device is reduced, and a service scenario is restored more comprehensively. In this manner, a capability of a virtual device is obtained in a multi-device capability query manner, and capabilities of a plurality of physical cameras of the plurality of devices are obtained. Therefore, power consumption of a local device is further reduced.

With reference to the first aspect or the first or second possible implementation of the first aspect, in a fourth possible implementation, if the first device detects video recording requests for the plurality of cameras, after that the first device renders the plurality of camera data streams to corresponding buffers, the method further includes:

performing synthesis processing on the camera data streams in the plurality of buffers in a background of an APK layer.

According to the video processing method in the foregoing implementation of this application, the camera data streams of the plurality of cameras are carried and displayed by using the plurality of views, the plurality of camera data streams are obtained from the camera HAL through the FWK layer, and the obtained plurality of camera data streams are rendered to the corresponding buffers obtained from the camera APK through the layer transferring module of the native layer (the FWK layer), so that the plurality of camera data streams are transmitted to the plurality of views of the camera APK, video recording synthesis processing is performed on the camera data streams in the plurality of buffers in the background of the APK layer, and a user is unaware of the recording synthesis process. This is more efficient than a conventional technology in which a plurality of camera data streams are synthesized and rendered to one view by using OpenGL at an APK layer.

According to a second aspect, an embodiment of this application provides a video processing apparatus. The apparatus is used on a first device, and the apparatus includes:

a first obtaining module, configured to: when detecting preview requests for a plurality of cameras, create views and buffers that correspond to the plurality of cameras in a camera Android application package APK, deliver the buffers corresponding to the views to a framework FWK layer, and obtain camera data streams corresponding to the plurality of cameras from a hardware abstraction layer HAL through the FWK layer; and a rendering module, configured to render the plurality of camera data streams to the corresponding buffers respectively through a layer transferring module of the FWK layer, to preview the views corresponding to the camera data streams.

According to the video processing apparatus in this application, when the preview requests for the plurality of cameras are detected, the views and the buffers that correspond to the plurality of cameras are created in the camera APK, the plurality of camera data streams are obtained from the camera HAL through the FWK layer, and the obtained plurality of camera data streams are rendered to the corresponding buffers obtained from the camera APK through the layer transferring module of a native layer (the FWK layer), so that the plurality of camera data streams are transmitted to the plurality of views of the camera APK, so as to rapidly implement multi-camera preview. This is more efficient than a related technology in which a plurality of camera data streams are synthesized and rendered to one view by using OpenGL at an APK layer.

With reference to a first possible implementation of the second aspect, the first device includes a virtual camera, and the apparatus further includes:

a second obtaining module, configured to obtain a hardware parameter of a physical camera on a second device by using a distributed mobile sensing development platform DMSDP service; and a configuration module, configured to locally configure a corresponding virtual camera based on the hardware parameter of the physical camera.

With reference to the first possible implementation of the second aspect, in a second possible implementation, the hardware parameter includes a camera capability parameter of the physical camera; and the configuration module includes:

a creation unit, configured to: create, based on the camera capability parameter, a virtual camera hardware abstraction layer HAL and a camera framework that correspond to the physical camera, and add the camera framework to a distributed camera framework, where the virtual camera HAL is located at the HAL, and the distributed camera framework is located at the FWK layer.

The DMSDP service is established between the first device and the second device, and the virtual camera HAL of the physical camera of the second device is locally established on the first device, to simulate real internet service provider (Internet Service Provider, ISP) control, so as to implement cross-device camera commands and data. Therefore, quick control of a distributed camera may be implemented.

With reference to the first or second possible implementation of the second aspect, in a third possible implementation, the first obtaining module includes:

a sending unit, configured to: when detecting the preview requests, if the plurality of cameras include a virtual camera, send, by the first device by using the DMSDP service, a control command to a physical camera corresponding to the virtual camera, where the control command is used for controlling the physical camera to capture a current image; and a receiving unit, configured to receive, by using the DMSDP service, a camera data stream returned by the physical camera in response to the control command, where the camera data stream includes the current image.

In a distributed camera scenario, according to the video processing apparatus in the foregoing implementation of this application, the first device undertakes and displays the camera data streams of the plurality of cameras by using the plurality of views, obtains the plurality of camera data streams from the virtual camera HAL through the FWK layer, and renders, through the layer transferring module of the native layer (the FWK layer), the obtained plurality of camera data streams to the corresponding buffers obtained from the camera APK, so that the plurality of camera data streams are transmitted to the plurality of views of the camera APK, and preview results are quickly generated. Quick preview can be implemented when a service or experience is completed under multi-device collaboration, and camera data of a plurality of devices is synchronously recorded. Power consumption of a single device is reduced, and a service scenario is restored more comprehensively. In this manner, a capability of a virtual device is obtained in a multi-device capability query manner, and capabilities of a plurality of physical cameras of the plurality of devices are obtained. Therefore, power consumption of a local device is further reduced.

With reference to the second aspect or the first or second possible implementation of the first aspect, in a fourth possible implementation, if the first device detects video recording requests for the plurality of cameras, after the rendering module, the apparatus further includes:

a synthesis module, configured to perform synthesis processing on the camera data streams in the plurality of buffers in a background of an APK layer.

According to the video processing apparatus in the foregoing implementation of this application, the camera data streams of the plurality of cameras are carried and displayed by using the plurality of views, the plurality of camera data streams are obtained from the camera HAL through the FWK layer, and the obtained plurality of camera data streams are rendered to the corresponding buffers obtained from the camera APK through the layer transferring module of the native layer (the FWK layer), so that the plurality of camera data streams are transmitted to the plurality of views of the camera APK, video recording synthesis processing is performed on the camera data streams in the plurality of buffers in the background of the APK layer, and a user is unaware of the recording synthesis process. This is more efficient than a conventional technology in which a plurality of camera data streams are synthesized and rendered to one view by using OpenGL at an APK layer.

According to a third aspect, an embodiment of this application provides a video processing apparatus, including a processor and a memory that is configured to store instructions that can be executed by the processor, where the processor is configured to execute the instructions to implement the foregoing video processing method.

According to a fourth aspect, an embodiment of this application provides a non-volatile computer-readable storage medium. The non-volatile computer-readable storage medium stores computer program instructions. When the computer program instructions are executed by a processor, the foregoing video processing method is implemented.

According to a fifth aspect, an embodiment of this application provides a terminal device. The terminal device may perform the video processing method according to one or more of the first aspect or the plurality of possible implementations of the first aspect.

According to a sixth aspect, an embodiment of this application provides a computer program product, including computer-readable code or a non-volatile computer-readable storage medium carrying the computer-readable code. When the computer-readable code is run in an electronic device, a processor in the electronic device performs the video processing method according to one or more of the first aspect or the plurality of possible implementations of the first aspect.

These aspects and other aspects of this application are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain principles of this application.

DESCRIPTION OF EMBODIMENTS

The following describes various example embodiments, features, and aspects of this application in detail with reference to the accompanying drawings. Identical reference signs in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment or illustration". Any embodiment described as an "example" is not necessarily explained as being superior or better than other embodiments.

In addition, to better describe this application, numerous specific details are given in the following specific implementations. A person skilled in the art should understand that this application can also be implemented without some specific details. In some embodiments, methods, means, elements, and circuits that are well-known to a person skilled in the art are not described in detail, so that the subject matter of this application is highlighted.

Currently, in a solution of a single device having a plurality of cameras, OpenGL (Open Graphics Library, open graphics library) is used for rendering at an APK (Android application package, Android application package) layer and then performing image fusion display, that is, OpenGL is used for synthesis rendering. This causes long duration for generating a preview image and a delay of the image.

In a distributed device scenario, a plurality of devices can be linked to complete a task or complete service experience. In a distributed camera scenario, as a quantity of devices increases, processing workload of OpenGL gradually increases. A problem in which duration for generating a preview image is long and the image is delayed also exists.

Figure 1A:
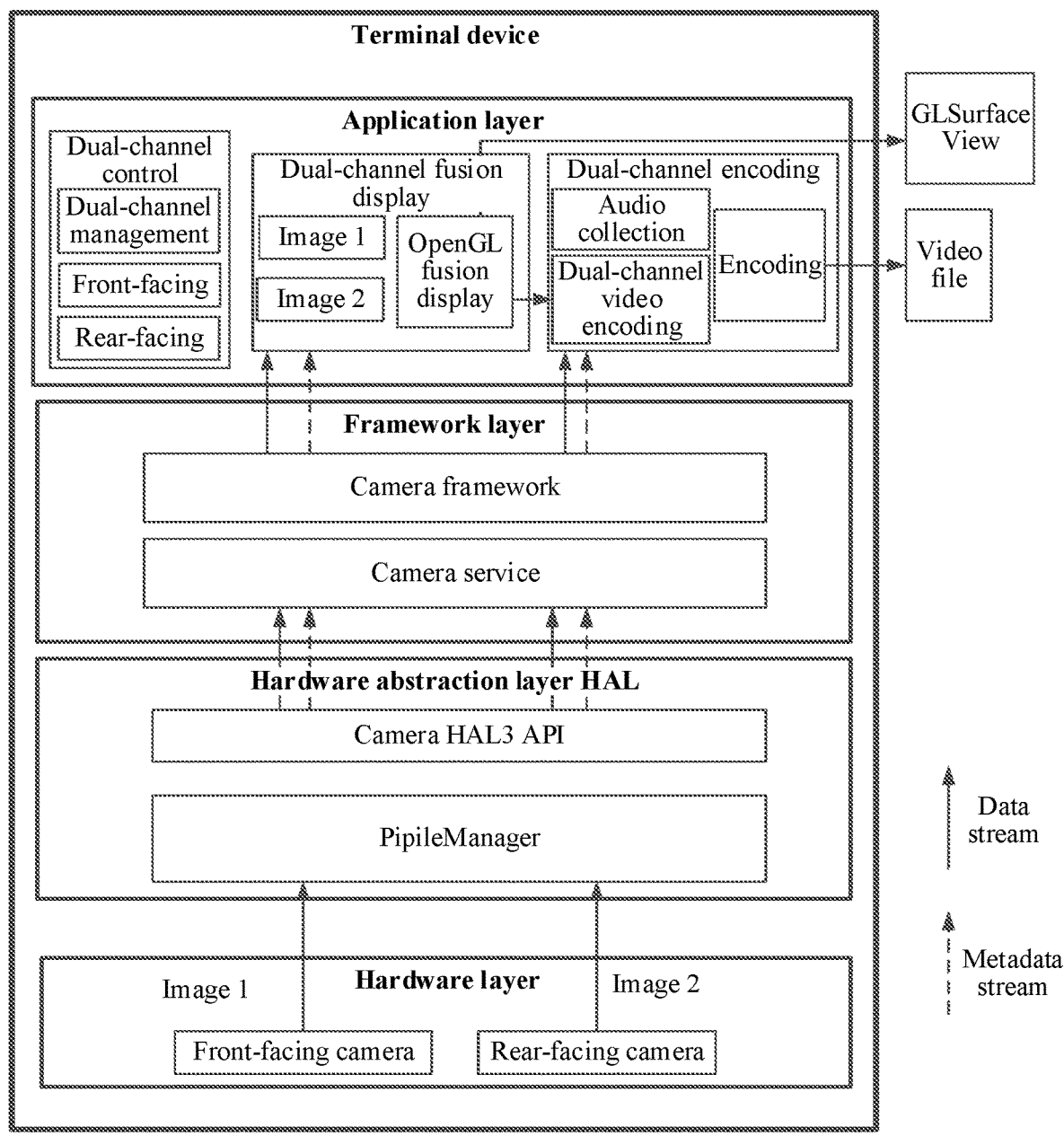
FIG. 1a is a schematic diagram of a scenario in which a single device has dual cameras in a related technology of this application.

FIG. 1a is a schematic diagram of a scenario in which a single device has dual cameras in a related technology of this application. As shown in FIG. 1a, in a solution of a single device having dual cameras, an electronic device includes two cameras (a front-facing camera and a rear-facing camera). When a camera APK (an application package of an application layer) previews two channels of images (an image 1 and an image 2) under an FWK (Framework, framework), the camera APK obtains, from a hardware abstraction layer HAL (Hardware Abstraction Layer) through an FWK layer, the two channels of images captured by hardware devices (the cameras). In the camera APK, the two channels of images are rendered to a view SurfaceView (dual-channel fusion display in FIG. 1a) by using OpenGL, and a rendered image is rendered to another SurfaceView by using a shared context shareContext and then sent to an encoding device for encoding (dual-channel encoding in FIG. 1a), to generate a video recording file. In the scenario in which the single device, images of cameras of other devices cannot be previewed. In the camera APK, OpenGL is used for rendering a plurality of channels of images. As a result, it takes long duration to generate preview images, affecting user experience.

Figure 1B:
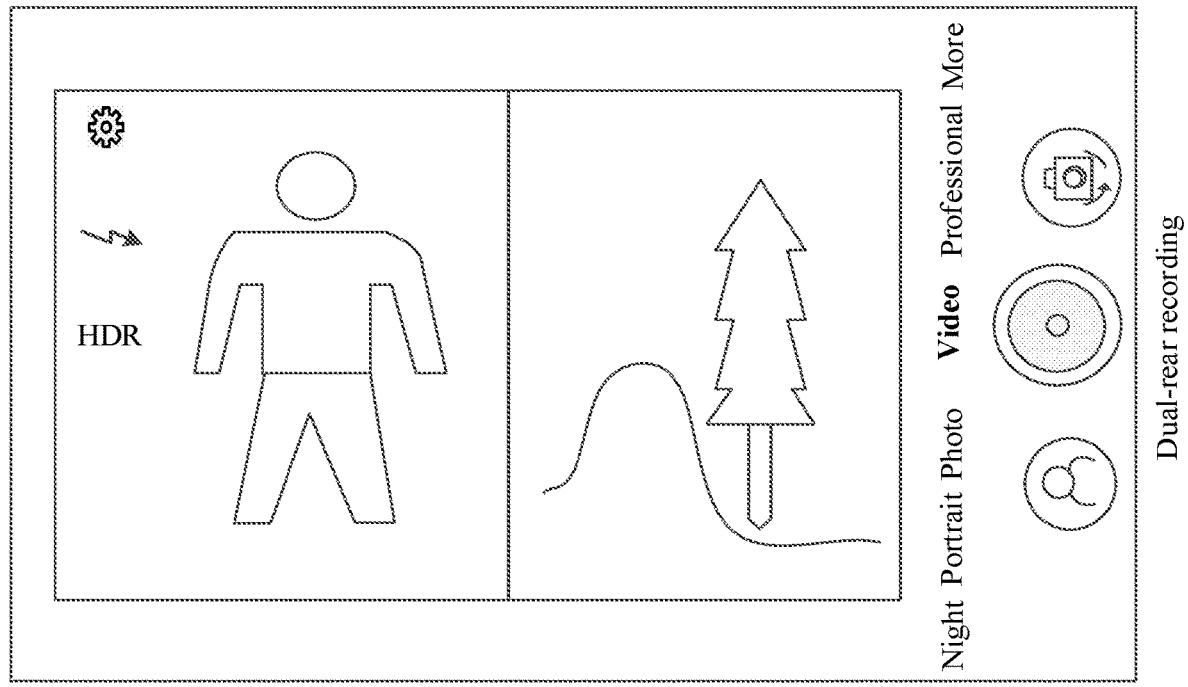
FIG. 1b and FIG. 1c each are a schematic diagram of preview display in a scenario in which a single device has a plurality of cameras.
Figure 1C:
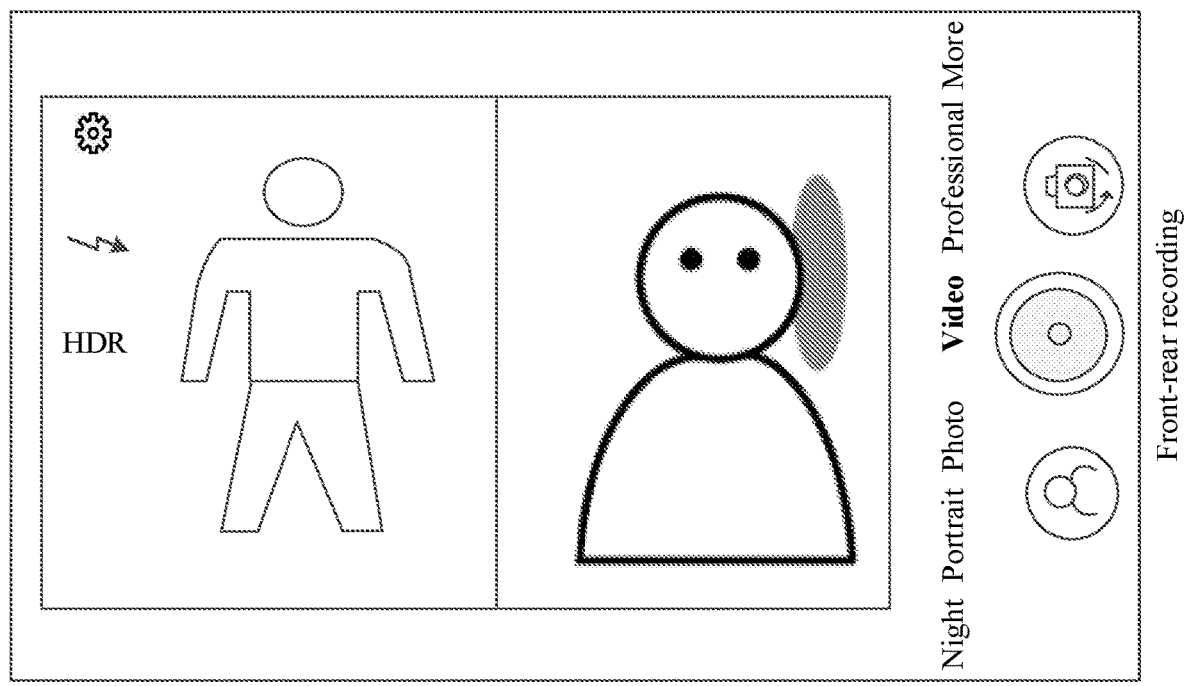

FIG. 1b and FIG. 1c each are a schematic diagram of preview display in a scenario in which a single device has a plurality of cameras. FIG. 1b is an example of performing preview by using dual rear-facing cameras. FIG. 1c is an example of performing dual-channel preview by using a front-facing camera and a rear-facing camera. In the related technology, during dual-channel (multi-channel) image preview, when OpenGL is used for synthesis rendering, duration for generating a preview image is long and a delay exists in the image.

Figure 2:
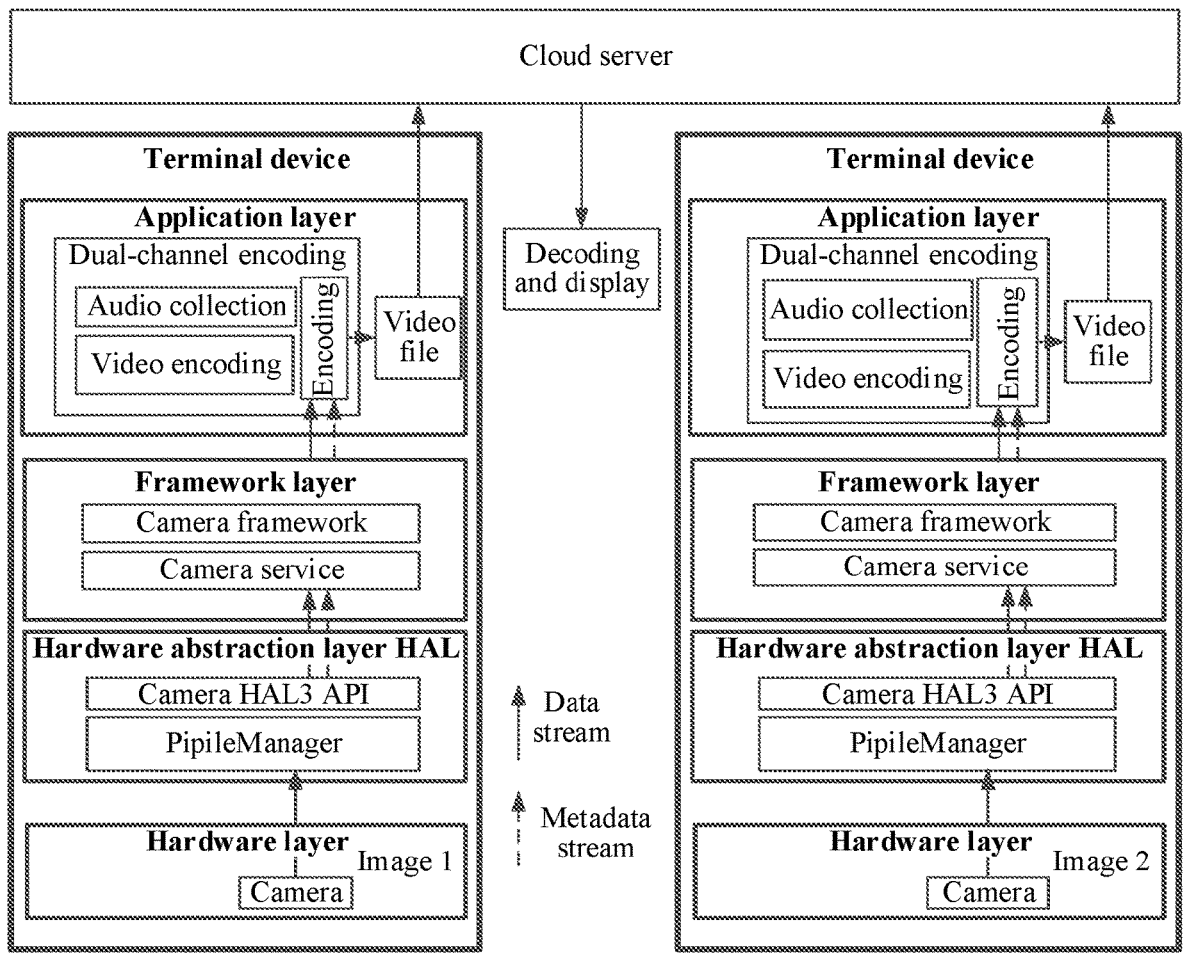
FIG. 2 is a schematic diagram of a distributed device scenario in a related technology of this application.

FIG. 2 is a schematic diagram of a distributed device scenario in a related technology of this application. As shown in FIG. 2, in a scenario of joint live broadcast of two hosts, two devices are connected to one cloud account and are connected to one cloud server. The two devices may locally encode data (video images, sounds, and the like) obtained by local cameras to obtain video files, and send the video files to the cloud server. After decoding the video files, the cloud server synthesizes two channels of images to obtain a synthesized image, and transmits the synthesized image to a user by using a network. In the distributed device scenario, the two devices need to connect to the cloud server by using the cloud account, send the collected data to a cloud, and download the synthesized image from the cloud. A speed is slow and a delay is high.

To resolve the foregoing technical problem, this application provides a video processing method. According to the video processing method in this application, when preview requests for a plurality of cameras are detected, views and buffers that correspond to the plurality of cameras are created in a camera APK, a plurality of camera data streams are obtained from a camera HAL through an FWK layer, and the obtained plurality of camera data streams are rendered to the corresponding buffers obtained from the camera APK through a layer transferring module of a native layer (the FWK layer), so that the plurality of camera data streams are transmitted to the plurality of views of the camera APK.

According to the video processing method provided in implementations of this application, the camera data streams of the plurality of cameras are carried and displayed by using the plurality of views, and the plurality of camera data streams are rendered to the buffers of the corresponding views by using the layer transferring module. This is more efficient than a related technology in which a plurality of camera data streams are synthesized and rendered to one view by using OpenGL at an APK layer.

According to the video processing method in embodiments of this application, fast rendering of multi-channel camera data can be implemented, and a preview image can be quickly generated. The method may be applied to a terminal device, so as to implement, on one terminal device, quick preview of a plurality of camera images from this device or another device at the same time.

The terminal device (including the foregoing device at a source end and the device at a receive end) in this application may be a device having a wireless connection function. The wireless connection function means that the terminal device may be connected to another terminal device in a wireless connection manner, for example, by using Wi-Fi or Bluetooth. The terminal device in this application may further have a function of performing communication through a wired connection. The terminal device in this application may be a touchscreen device, or may be a non-touchscreen device, or may be a device having no screen. The touchscreen terminal device may be controlled by tapping or sliding on a display screen by using a finger, a stylus, or the like. The non-touchscreen terminal device may be connected to an input device such as a mouse, a keyboard, or a touch panel, and is controlled by using the input device. The device having no screen may be, for example, a Bluetooth speaker having no screen.

For example, the terminal device in this application may be a smartphone, a netbook, a tablet computer, a notebook computer, a wearable electronic device (such as a smart band or a smart watch), a TV, a virtual reality device, an acoustic device, electronic ink screen, or the like.

Figure 3:
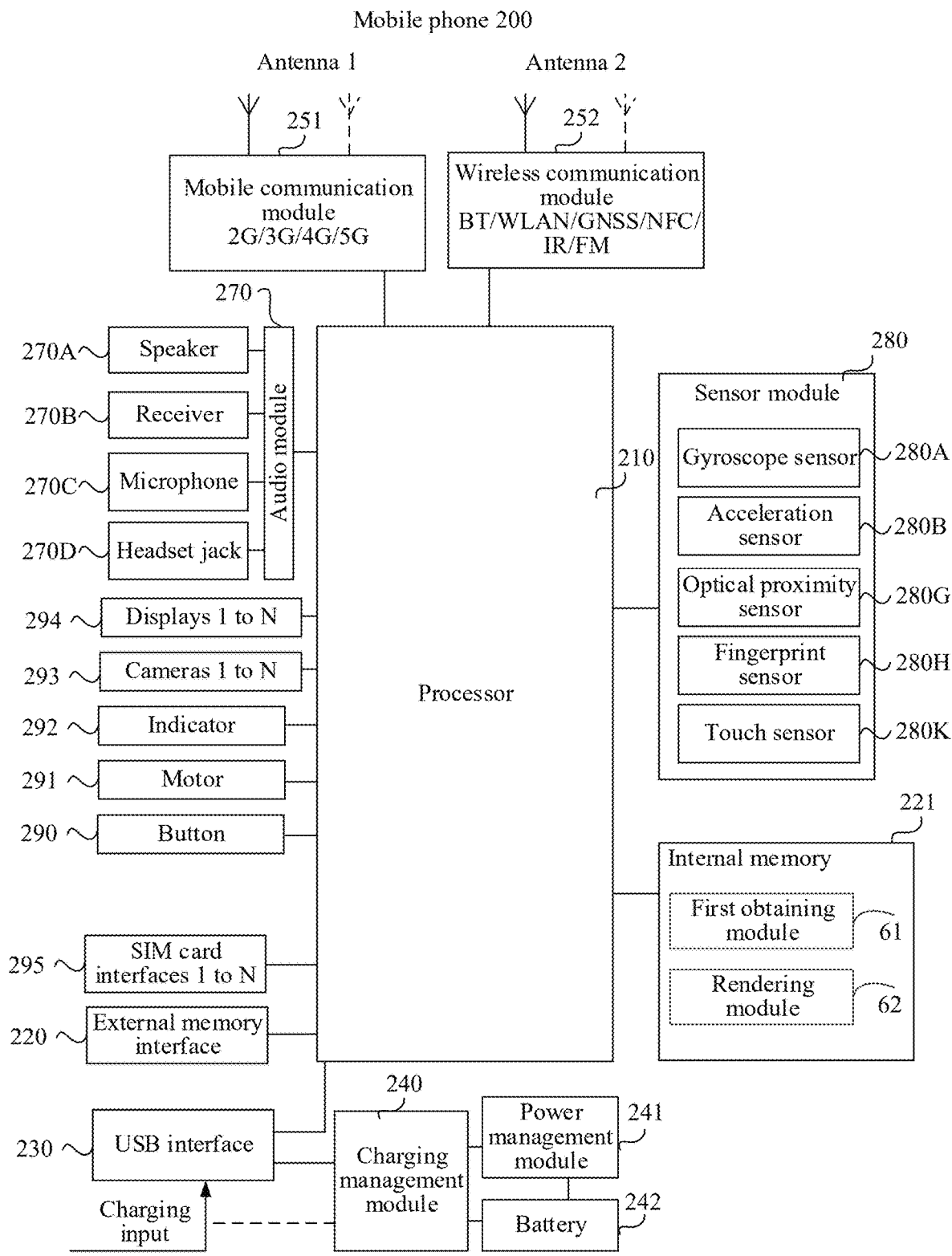
FIG. 3 is a schematic diagram of a structure of a terminal device according to an embodiment of this application.

FIG. 3 is a schematic diagram of a structure of a terminal device according to an embodiment of this application. For example, the terminal device is a mobile phone. FIG. 3 is a schematic diagram of a structure of a mobile phone 200.

The mobile phone 200 may include a processor 210, an external memory interface 220, an internal memory 221, a USB interface 230, a charging management module 240, a power management module 241, a battery 242, an antenna 1, an antenna 2, a mobile communication module 251, a wireless communication module 252, an audio module 270, a speaker 270A, a telephone receiver 270B, a microphone 270C, a headset jack 270D, a sensor module 280, a button 290, a motor 291, an indicator 292, a camera 293, a display 294, a SIM card interface 295, and the like. The sensor module 280 may include a gyroscope sensor 280A, an acceleration sensor 280B, an optical proximity sensor 280G, a fingerprint sensor 280H, and a touch sensor 280K (certainly, the mobile phone 200 may further include other sensors such as a temperature sensor, a pressure sensor, a distance sensor, a magnetic sensor, an ambient light sensor, a barometric pressure sensor, and a bone conduction sensor, which are not shown in the figure).

It may be understood that an illustrated structure in this embodiment of this application does not constitute a specific limitation on the mobile phone 200. In some other embodiments of this application, the mobile phone 200 may include more or fewer components than those shown in the figure, combine some components, divide some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (Neural network Processing Unit, NPU). Different processing units may be independent devices, or may be integrated into one or more processors. The controller may be a nerve center and a command center of the mobile phone 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting duration of the processor 210, so that system efficiency is improved.

The processor 210 may run the video processing method provided in embodiments of this application, to quickly generate a preview image. The processor 210 may include different devices. For example, when a CPU and a GPU are integrated, the CPU and the GPU may cooperate to perform the video processing method provided in embodiments of this application. For example, in the video processing method, some algorithms are executed by the CPU, and the other algorithms are executed by the GPU, to obtain high processing efficiency.

The display 294 is configured to display an image, a video, or the like, and may be further configured to preview an image or a video before capturing. For example, in an implementation of this application, preview of a plurality of cameras may be performed by using the display 294. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light emitting diode (flexible light emitting diode, FLED), a mini-LED, a micro-LED, a micro-OLED, a quantum dot light emitting diode (quantum dot light emitting diode, QLED), or the like. In some embodiments, the mobile phone 200 may include one or N displays 294, where N is a positive integer greater than 1. The display 294 may be configured to display information entered by a user or information provided to a user, and various graphical user interfaces (graphical user interfaces, GUIs). For example, the display 294 may display a photo, a video, a web page, a file, or the like. For another example, the display 294 may display a graphical user interface. The graphical user interface may include a status bar, a navigation bar that can be hidden, a time and weather widget (widget), and an application icon, for example, a browser icon. The status bar includes an operator name (for example, China Mobile), a mobile network (for example, 4G), time, and a battery level. The navigation bar includes an icon of a back (back) button, an icon of a home (home) button, and an icon of a forward button. In addition, it may be understood that, in some embodiments, the status bar may further include a Bluetooth icon, a Wi-Fi icon, an icon of an externally-connected device, and the like. It may be further understood that, in some other embodiments, the graphical user interface may further include a dock bar, and the dock bar may include an icon of a frequently-used application and the like. After the processor 210 detects a touch event of a user on an application icon by using a finger (a stylus or the like), in response to the touch event, the processor 210 starts a user interface of an application corresponding to the application icon, and displays the user interface of the application on the display 294.

In this embodiment of this application, the display 294 may be one integrated flexible display, or may be a spliced display including two rigid screens and one flexible screen located between the two rigid screens.

After the processor 210 performs the video processing method provided in embodiments of this application, the terminal device may establish a connection to another terminal device through an antenna 1, an antenna 2, or a USB interface, and transmit data and control the display 294 to display a corresponding graphical user interface according to the video processing method provided in embodiments of this application.

The camera 293 (which may be a front-facing camera, a rear-facing camera, or a camera that may serve as both a front-facing camera and a rear-facing camera) is configured to capture a static image or a video. Usually, the camera 293 may include a photosensitive element such as a lens group and an image sensor. The lens group includes a plurality of lenses (convex lenses or concave lenses), and is configured to: collect an optical signal reflected by a to-be-photographed object, and transfer the collected optical signal to the image sensor. The image sensor generates an original image of the to-be-photographed object based on the optical signal.

The internal memory 221 may be configured to store computer-executable program code, and the executable program code includes instructions. The processor 210 runs the instructions stored in the internal memory 221, to implement various function applications and data processing of the mobile phone 200. The internal memory 221 may include a program storage area and a data storage area. The program storage area may store code of an operating system, an application (for example, a camera application or a WeChat application), and the like. The data storage area may store data (for example, an image or a video collected by the camera application) and the like that are created during use of the mobile phone 200.

The internal memory 221 may further store one or more computer programs 1310 corresponding to the video processing method provided in embodiments of this application. The one or more computer programs 1304 are stored in the memory 221 and are configured to be executed by the one or more processors 210. The one or more computer programs 1310 include instructions. The instructions may be used for performing steps in an embodiment corresponding to FIG. 5a, FIG. 5b, FIG. 9, or FIG. 10. The computer program 1310 may include a first obtaining module 61 and a rendering module 62. The first obtaining module 61 is configured that the first terminal device configured to: when detecting preview requests for a plurality of cameras, create views and buffers that correspond to the plurality of cameras in a camera Android application package APK, deliver the buffers corresponding to the views to a framework FWK layer, and obtain camera data streams corresponding to the plurality of cameras from a hardware abstraction layer HAL through the FWK layer. The rendering module 62 is configured to render the plurality of camera data streams to the corresponding buffers respectively through a layer transferring module of the FWK layer, to preview the views corresponding to the camera data streams.

In addition, the internal memory 221 may include a high-speed random access memory, and may further include a non-volatile memory, for example, at least one magnetic disk storage device, a flash memory, or a universal flash storage (universal flash storage, UFS).

Certainly, code of the video processing method provided in embodiments of this application may alternatively be stored in an external storage. In this case, the processor 210 may run, by using the external memory interface 220, the code of the video processing method stored in the external storage.

The following describes functions of the sensor module 280.

The gyroscope sensor 280A may be configured to determine a motion posture of the mobile phone 200. In some embodiments, angular velocities of the mobile phone 200 around three axes (namely, axes x, y, and z) may be determined by using the gyroscope sensor 280A. In other words, the gyroscope sensor 280A may be configured to detect a current motion status of the mobile phone 200, for example, a shaking state or a static state.

When the display in this embodiment of this application is a foldable screen, the gyroscope sensor 280A may be configured to detect a folding or unfolding operation performed on the display 294. The gyroscope sensor 280A may report the detected folding or unfolding operation as an event to the processor 210, to determine whether the display 294 is in a folded state or an unfolded state.

The acceleration sensor 280B may detect a magnitude of acceleration in each direction (usually on three axes) of the mobile phone 200. In other words, the gyroscope sensor 280A may be configured to detect a current motion status of the mobile phone 200, for example, a shaking state or a static state. When the display in this embodiment of this application is a foldable screen, the acceleration sensor 280B may be configured to detect a folding or unfolding operation performed on the display 294. The acceleration sensor 280B may report the detected folding or unfolding operation as an event to the processor 210, to determine whether the display 294 is in a folded state or an unfolded state.

The optical proximity sensor 280G may include a light emitting diode (LED) and an optical detector, for example, a photodiode. The light emitting diode may be an infrared light emitting diode. The mobile phone emits infrared light by using the light emitting diode. The mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone. When the display in this embodiment of this application is a foldable screen, the optical proximity sensor 280G may be disposed on a first screen of the foldable display 294, and the optical proximity sensor 280G may detect a magnitude of an angle between the first screen and a second screen in a folded or unfolded state based on an optical path difference between infrared signals.

The gyroscope sensor 280A (or the acceleration sensor 280B) may send detected motion status information (for example, the angular velocity) to the processor 210. The processor 210 determines, based on the motion status information, whether the mobile phone is currently in a handheld state or a tripod state (for example, when the angular velocity is not 0, it indicates that the mobile phone 200 is in the handheld state).

The fingerprint sensor 280H is configured to collect a fingerprint. The mobile phone 200 may use a feature of the collected fingerprint to implement fingerprint-based unlocking, application lock access, fingerprint-based photographing, fingerprint-based call answering, and the like.

The touch sensor 280K is also referred to as a "touch panel". The touch sensor 280K may be disposed in the display 294, and the touch sensor 280K and the display 294 form a touchscreen, which is also referred to as a "touch control screen". The touch sensor 280K is configured to detect a touch operation performed on or near the touch sensor 280K. The touch sensor may transfer the detected touch operation to the application processor to determine a type of a touch event. Visual output related to the touch operation may be provided by using the display 294. In some other embodiments, the touch sensor 280K may alternatively be disposed on a surface of the mobile phone 200 at a location different from that of the display 294.

For example, the display 294 of the mobile phone 200 displays a home screen, and the home screen includes icons of a plurality of applications (for example, a camera application and a WeChat application). The user taps an icon of the camera application on the home screen via the touch sensor 280K, to trigger the processor 210 to start the camera application and turn on the camera 293. The display 294 displays an interface of the camera application, for example, a viewfinder interface.

A wireless communication function of the mobile phone 200 may be implemented by using the antenna 1, the antenna 2, the mobile communication module 251, the wireless communication module 252, the modem processor, the baseband processor, and the like.

The antenna 1 and the antenna 2 are configured to transmit and receive an electromagnetic wave signal. Each antenna in the mobile phone 200 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 251 may provide a solution that is applied to the mobile phone 200 and that includes wireless communication such as 2G, 3G, 4G, and 5G. The mobile communication module 251 may include at least one filter, a switch, a power amplifier, a low noise amplifier (low noise amplifier, LNA), and the like. The mobile communication module 251 may receive an electromagnetic wave through the antenna 1, perform processing such as filtering or amplification on the received electromagnetic wave, and transmit the electromagnetic wave to the modem processor for demodulation. The mobile communication module 251 may further amplify a signal modulated by the modem processor, and convert, through the antenna 1, the signal into an electromagnetic wave for radiation. In some embodiments, at least some functional modules in the mobile communication module 251 may be disposed in the processor 210. In some embodiments, at least some functional modules of the mobile communication module 251 may be disposed in a same device with at least some modules of the processor 210. In this embodiment of this application, the mobile communication module 251 may be further configured to exchange information with another terminal device. For example, a control command and a camera data stream are exchanged with another device by using a DMSDP (English full name: distributed mobile sensing development platform, Chinese full name: distributed mobile sensing development platform).

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 270A, the telephone receiver 270B, or the like), or displays an image or a video by using the display 294. In some embodiments, the modem processor may be an independent device. In some other embodiments, the modem processor may be independent of the processor 210, and is disposed in a same device as the mobile communication module 251 or another functional module.

The wireless communication module 252 may provide a solution that is applied to the mobile phone 200 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 252 may be one or more devices integrating at least one communication processing module. The wireless communication module 252 receives an electromagnetic wave through the antenna 2, performs frequency modulation and filtering processing on an electromagnetic wave signal, and sends a processed signal to the processor 210. The wireless communication module 252 may further receive a to-be-sent signal from the processor 210, perform frequency modulation and amplification on the to-be-sent signal, and convert, through the antenna 2, the signal into an electromagnetic wave for radiation. In this embodiment of this application, the wireless communication module 252 is configured to transmit data with another terminal device under control of the processor 210. For example, when the processor 210 runs the video processing method provided in embodiments of this application, the processor may control the wireless communication module 252 to send a control command to the another terminal device to control a camera of the another device, and may further receive camera data streams returned by the another terminal device according to the control command, and then render, by using a layer transferring module surfaceFlinger of an FWK layer, the obtained plurality of camera data streams to buffers corresponding to the camera data streams obtained from a camera APK, so that the plurality of camera data streams are transferred to SurfaceView of the camera APK, and a preview image is quickly generated.

In addition, the mobile phone 200 may implement an audio function, for example, music playing and recording, by using the audio module 270, the speaker 270A, the telephone receiver 270B, the microphone 270C, the headset jack 270D, the application processor, and the like. The mobile phone 200 may receive an input from the button 290, and generate a button signal input related to a user setting and function control of the mobile phone 200. The mobile phone 200 may generate a vibration prompt (for example, an incoming call vibration prompt) by using the motor 291. The indicator 292 in the mobile phone 200 may be an indicator light, may be configured to indicate a charging status and a power change, or may be configured to indicate a message, a missed call, a notification, and the like. The SIM card interface 295 in the mobile phone 200 is configured to connect to a SIM card. A SIM card may be inserted into the SIM card interface 295 or removed from the SIM card interface 295, to implement contact with or separation from the mobile phone 200.

It should be understood that during actual application, the mobile phone 200 may include more or fewer components than those shown in FIG. 3. This is not limited in this embodiment of this application. The mobile phone 200 shown in the figure is merely an example, and the mobile phone 200 may have more or fewer components than those shown in the figure, two or more components may be combined, or different component configurations may be used. Components shown in the figure may be implemented by using hardware including one or more signal processing and/or application-specific integrated circuits, software, or a combination of hardware and software.

A software system of the terminal device may use a layered architecture, an event-driven architecture, a micro-kernel architecture, a micro service architecture, or a cloud architecture. In embodiments of this application, an Android system with a layered architecture is used as an example to describe a software structure of a terminal device.

Figure 4:
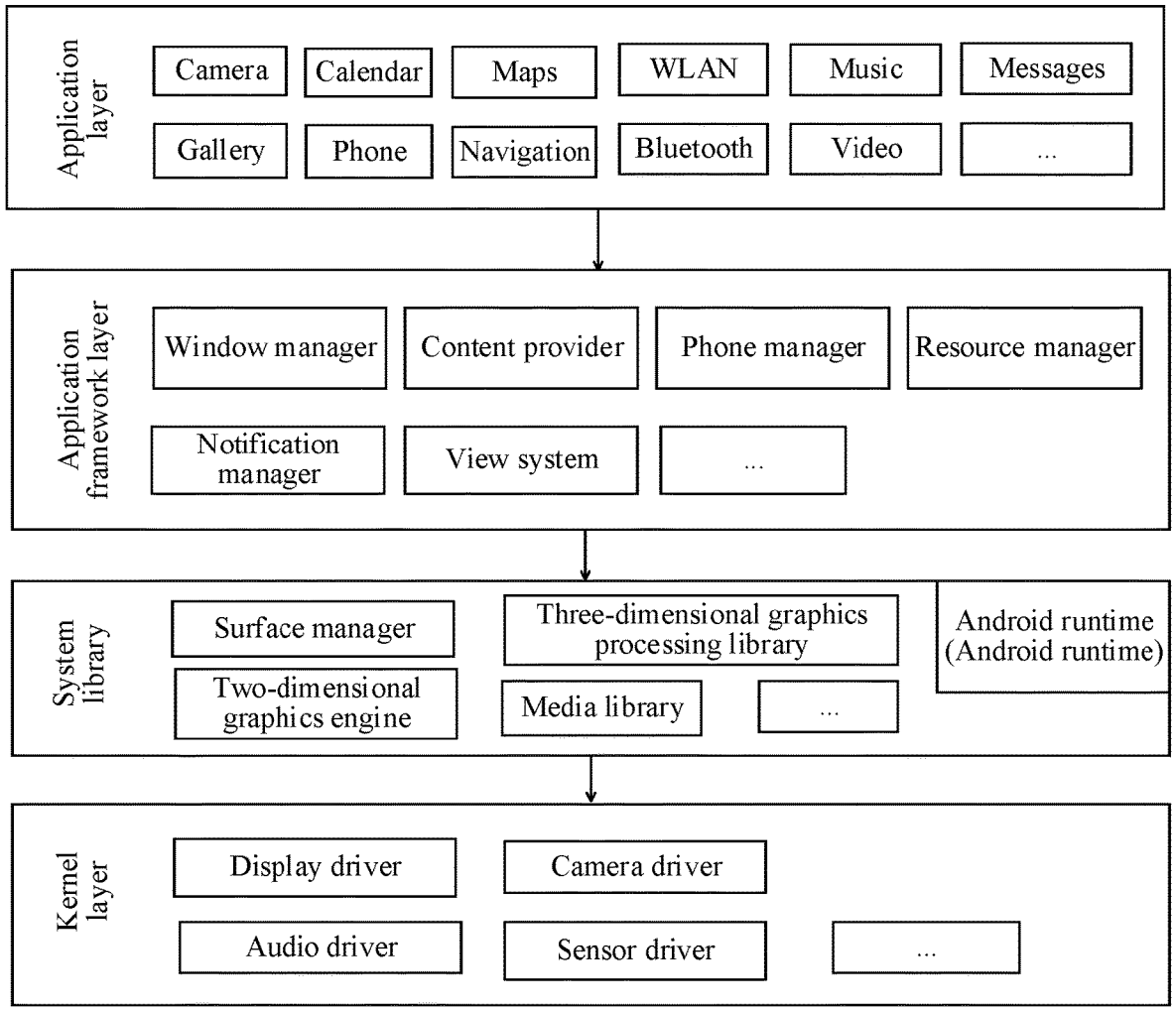
FIG. 4 is a block diagram of a software structure of a terminal device according to an embodiment of this application.

FIG. 4 is a block diagram of a software structure of a terminal device according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 4, the application packages may include applications such as Dialer, Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and a bookmark, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the terminal device, for example, management of call statuses (including answering, declining, and the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run in a background, or may be a notification that appears on the screen in a form of a dialog window. For example, text information is displayed in the status bar, an announcement is given, the terminal device vibrates, or an indicator light blinks.

The Android runtime includes a kernel library and a virtual machine. The Android runtime is responsible for scheduling and management of the Android system.

The kernel library includes two parts: a performance function that needs to be invoked in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of frequently used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 5A:
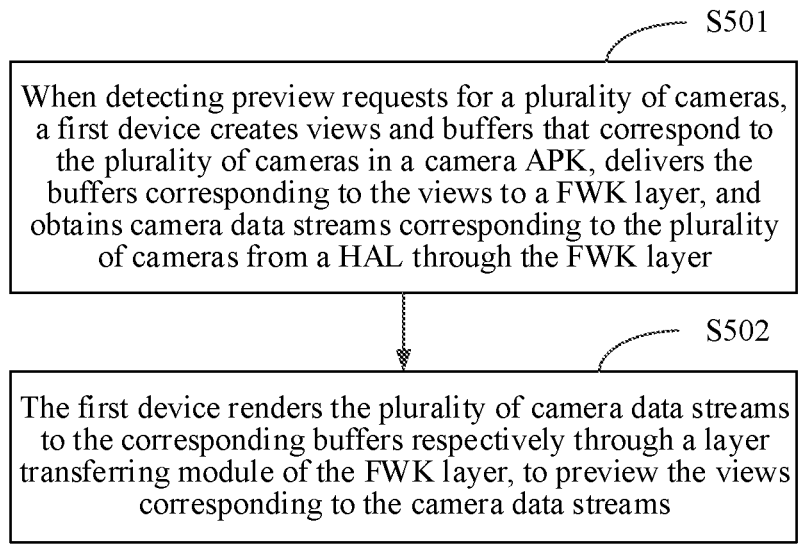
FIG. 5a is a flowchart of a video processing method according to an embodiment of this application.

FIG. 5a is a flowchart of a video processing method according to an embodiment of this application. As shown in FIG. 5a, the video processing method in this application may be applied to the foregoing terminal device, and may specifically include the following steps.

Step S501: When detecting preview requests for a plurality of cameras, a first device creates views and buffers that correspond to the plurality of cameras in a camera APK, delivers the buffers corresponding to the views to an FWK layer, and obtains camera data streams corresponding to the plurality of cameras from a HAL through the FWK layer.

Step S502: The first device renders the plurality of camera data streams to the corresponding buffers respectively through a layer transferring module of the FWK layer, to preview the views corresponding to the camera data streams.

The preview request may be generated when the first device detects an operation of turning on the camera or an operation of performing video recording, and the preview request may include a control command for turning on the camera and an identifier of the camera. The operation of turning on the camera may be that a user taps an icon of a camera application on a screen, and the operation of performing video recording may be that the user taps a control such as "video recording" or "visual recording" to start video recording after turning on the camera.

When detecting the foregoing operation, the first device may generate the preview request, and deliver, based on the identifier that is of the camera and that is carried in the preview request, the preview request to a physical camera corresponding to the identifier of the camera, so as to turn on the physical camera to capture a real-time image.

In a possible implementation, for a scenario in which a single device has a plurality of cameras, the physical camera may be one or more local cameras of the first device. The first terminal device may include a plurality of physical cameras. A mobile phone is used as an example. A front-facing camera and a rear-facing camera may be configured on the mobile phone. There may be one or more front-facing cameras and one or more rear-facing cameras configured on the mobile phone. This is not limited in this application. When the first device includes a plurality of physical cameras, each physical camera has a corresponding identifier (ID). Therefore, the preview request generated by the first device may carry an identifier of a corresponding physical camera. In this way, the first device may deliver the preview request to the corresponding physical camera based on the identifier that is of the physical camera and that is carried in the preview request, to control the physical camera corresponding to the preview request.

For example, a user taps the icon of the camera application on the screen. After detecting the operation of the user, the first device generates a preview request. An identifier that is of a physical camera and that is carried in the preview request may be an identifier of the rear-facing camera by default (or may be an identifier of the front-facing camera, which is not limited in this application). If the user taps a "camera switching" control on the screen after turning on the camera, the first device may generate a new preview request after detecting the operation of the user, and an identifier that is of a physical camera and that is carried in the preview request may be the identifier of the front-facing camera. After generating the preview request, the first device may deliver the preview request to the physical camera corresponding to the identifier of the camera through the camera APK, the FWK layer, and an HAL layer, and control the corresponding physical camera to be turned on and to capture a real-time image. In this way, the first device may obtain a corresponding camera data stream from the camera HAL at the HAL layer, and the camera data stream may also carry the identifier of the corresponding physical camera.

When detecting the preview requests, the first device may further determine, based on identifiers of the cameras in the preview requests, a quantity of views that carry the camera data streams; create the views corresponding to the plurality of cameras in the camera APK; and allocate a corresponding first buffer to one of the views, to render the camera data streams of the plurality of cameras. The first device may deliver, layer by layer, the views to the FWK layer and the HAL. The camera HAL of the HAL may create a second buffer corresponding to one of the views. After receiving an image captured by a corresponding physical camera, the camera HAL may store the image in the second buffer.

In an implementation of this application, the view may be a SurfaceView, and both the first buffer and the second buffer may be buffers. For example, the first buffer is a Buffer 1, and the second buffer is a Buffer 2. The layer transferring module may be a Surfaceflinger.

In an implementation of this application, the first device may deliver the Buffer 1 corresponding to the SurfaceView to the FWK layer, for example, deliver address information of the Buffer 1 corresponding to the SurfaceView to the FWK layer. After the FWK layer of the first device obtains the plurality of camera data streams from the camera HAL, the first device may render the obtained camera data streams to the Buffer 1 at a native layer (the FWK layer) through the Surfaceflinger of the FWK layer, so that the user can perform preview.

In a scenario in which a single device has a plurality of physical cameras, if multi-camera preview needs to be performed, different SurfaceViews are used for carrying camera data streams of the cameras. The first device may allocate corresponding buffers to the plurality of Surface-Views, and each physical camera corresponds to one SurfaceView and one buffer. When performing rendering, the first device may render the camera data stream to the corresponding buffer based on an identifier of the physical camera corresponding to the camera data stream.

According to the video processing method in the foregoing implementation of this application, the camera data streams of the plurality of cameras are carried and displayed by using the plurality of views, and the obtained camera data streams are rendered to the corresponding buffers obtained from the camera APK through the surfaceFlinger of the native layer (the FWK layer), so that the plurality of camera data streams are transmitted to the plurality of views of the camera APK. This is more efficient than a related technology in which a plurality of camera data streams are synthesized and rendered to one view by using OpenGL at an APK layer.

Figure 5B:
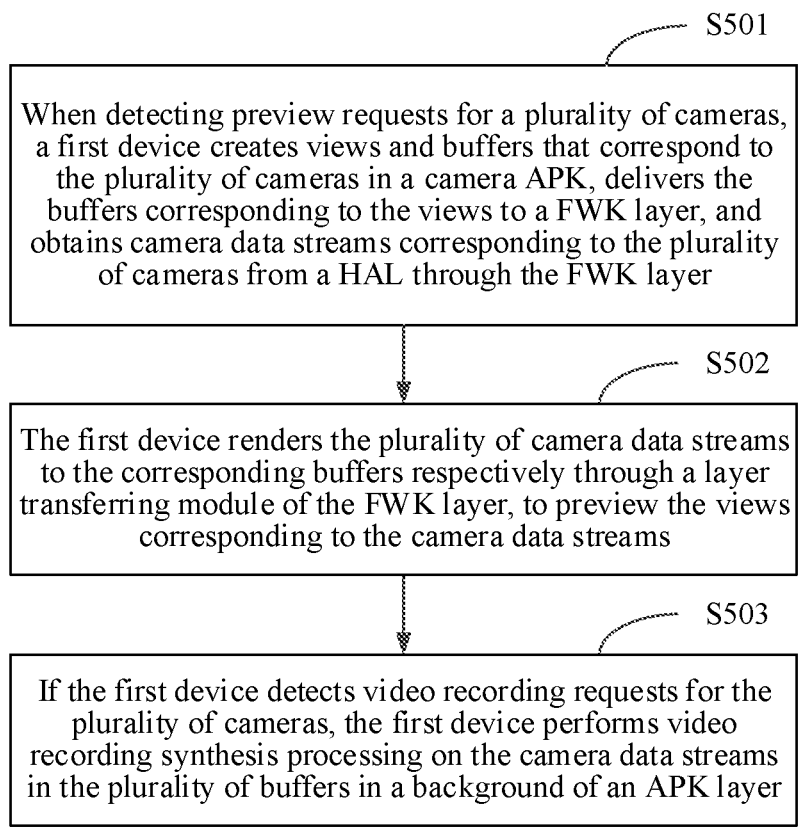
FIG. 5b is a flowchart of a video processing method according to an embodiment of this application.

FIG. 5b is a flowchart of a video processing method according to an embodiment of this application. As shown in FIG. 5b, for the case in which the plurality of camera data streams are obtained, the video processing method in this application may further include the following steps.

Step S503: If the first device detects video recording requests for the plurality of cameras, the first device performs video recording synthesis processing on the camera data streams in the plurality of buffers in a background of the APK layer.

The video recording request may be generated when the user taps a control such as "video recording" or "visual recording" to start video recording after turning on the camera. After detecting the foregoing operation, the first device generates the video recording request, delivers the video recording request, layer by layer, through the camera APK, the FWK layer, and the HAL layer, obtains the plurality of camera data streams, and obtains the buffer 1 corresponding to each camera data stream from the camera APK. The first device respectively renders the plurality of camera data streams to the corresponding buffer 1 through the layer transferring module surfaceFlinger of the FWK layer. Then, the first device performs, in the background of the APK layer, video recording synthesis processing on the camera data streams on the plurality of buffers 1, to obtain video data synthesized after the plurality of cameras perform video recording.

According to the video processing method in the foregoing implementation of this application, the camera data streams of the plurality of cameras are carried and displayed by using the plurality of views, the plurality of camera data streams are obtained from the camera HAL through the FWK layer, and the obtained plurality of camera data streams are rendered to the corresponding buffers obtained from the camera APK through the layer transferring module surfaceFlinger of the native layer (the FWK layer), so that the plurality of camera data streams are transmitted to the plurality of views of the camera APK, video recording synthesis processing is performed on the camera data streams in the plurality of buffers in the background of the APK layer, and a user is unaware of the recording synthesis process. This is more efficient than a conventional technology in which a plurality of camera data streams are synthesized and rendered to one view by using OpenGL at an APK layer.

Figure 6:
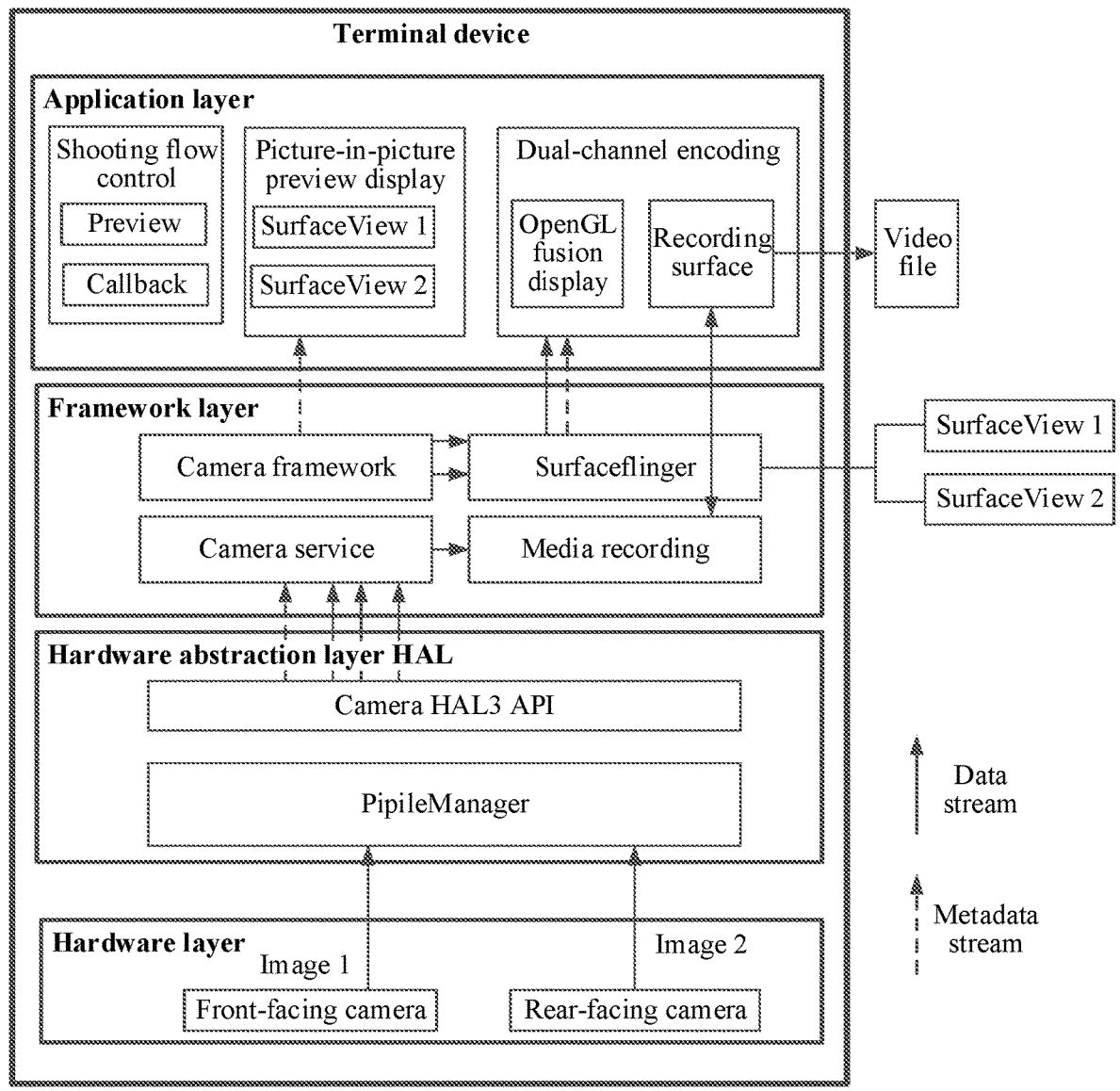
FIG. 6 is a block diagram in which a first device implements a video processing method according to an implementation of this application.

FIG. 6 is a block diagram in which a first device implements a video processing method according to an implementation of this application. An example shown in FIG. 6 is a scenario in which a single device has dual cameras. As shown in FIG. 6, a hardware layer includes two local cameras, an HAL layer includes a corresponding camera HAL API (Application Programming Interface, application programming interface), an FWK layer includes a camera FWK and a Surfaceflinger, and a camera APK at an APK layer includes modules such as two SurfaceViews (a SurfaceView 1 and a SurfaceView 2), OpenGLs, and video recording surfaces that correspond to the local cameras.

When detecting preview requests, the first device may turn on a plurality of cameras of the first device from the camera APK, deliver the preview (video recording) requests, layer by layer, through the camera APK, the FWK layer, and the HAL layer, and obtain camera data streams by using the plurality of local hardware cameras. The first device obtains the camera data streams from the hardware devices through the HAL layer, processes the camera data streams in a PipileManager of the HAL layer, and transmits processed camera data streams to the FWK layer through the Camera HAL3 API interface. The first device performs buffer rotation through the FWK layer, and exchanges the two preview SurfaceViews provided by the camera APK and the two received camera data streams transmitted through the HAL layer. Specifically, the first device renders, through the surfaceFlinger of the FWK layer, the camera data streams obtained from the HAL layer to two empty buffers (corresponding to the two SurfaceViews respectively, where rendering in the buffers can implement rendering of the SurfaceViews) obtained from the camera APK, so as to transmit the camera data streams to the camera APK. Efficiency of rendering through the SurfaceFlinger at a native layer is higher than that of rendering by using OpenGL at the APK layer. If video recording requests are delivered, a previous process is the same as the foregoing preview procedure. After rendering, the first device may further perform video recording synthesis in a background of the APK layer to obtain synthesized video data, and a user is unaware of the synthesis process.

Figure 7:
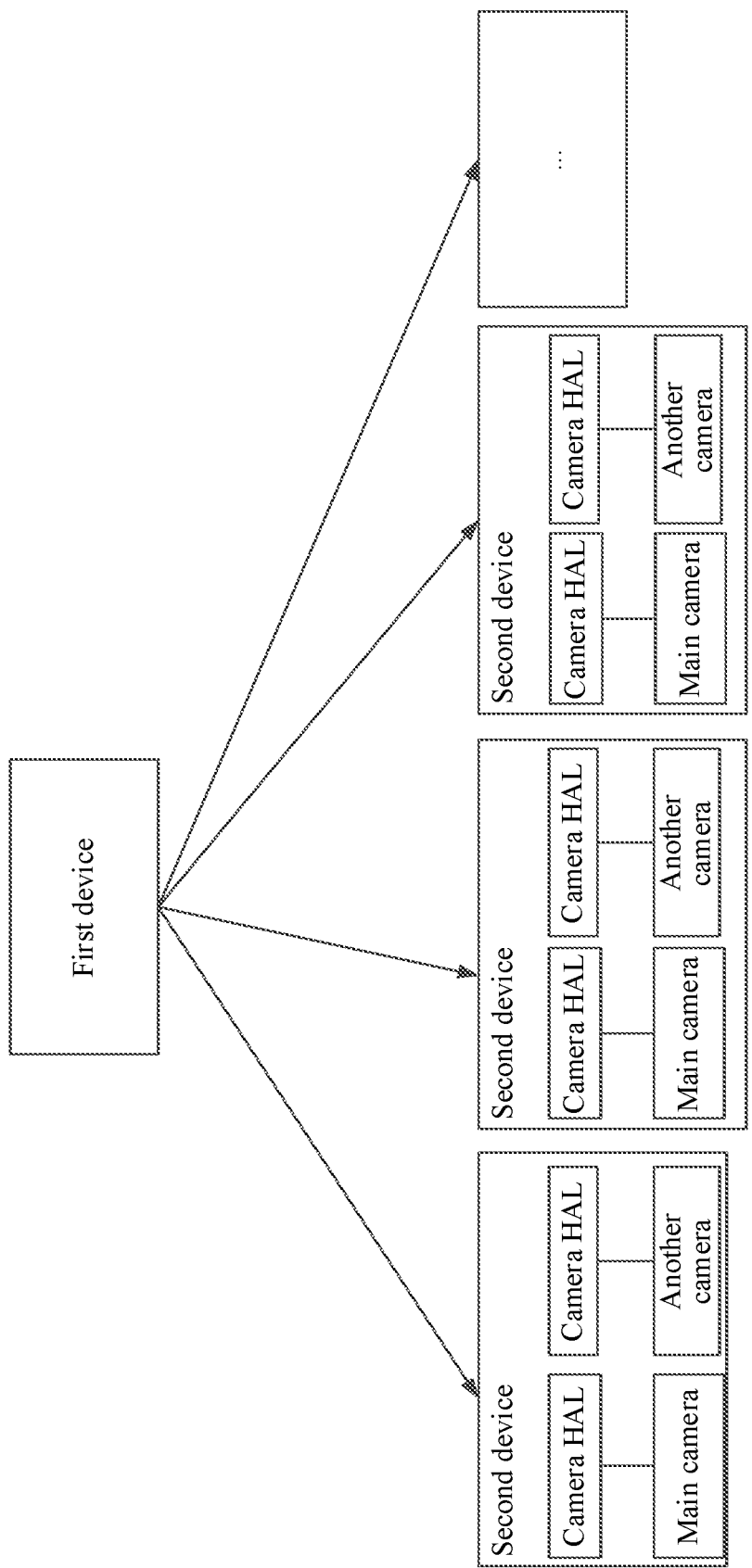
FIG. 7 is a schematic diagram of a distributed camera scenario according to an implementation of this application.

In a possible implementation, the video processing method in this application may be further applied to a distributed camera scenario. FIG. 7 is a schematic diagram of a distributed camera scenario according to an implementation of this application. As shown in FIG. 7, an application scenario may include a first device, and the first device may be a terminal device such as a mobile phone, a pad, or a smart watch. The application scenario may further include one or more second devices. The second device may be an in-vehicle camera, a mobile phone, a pad, a smart watch, or the like that includes a camera.

Figure 8:
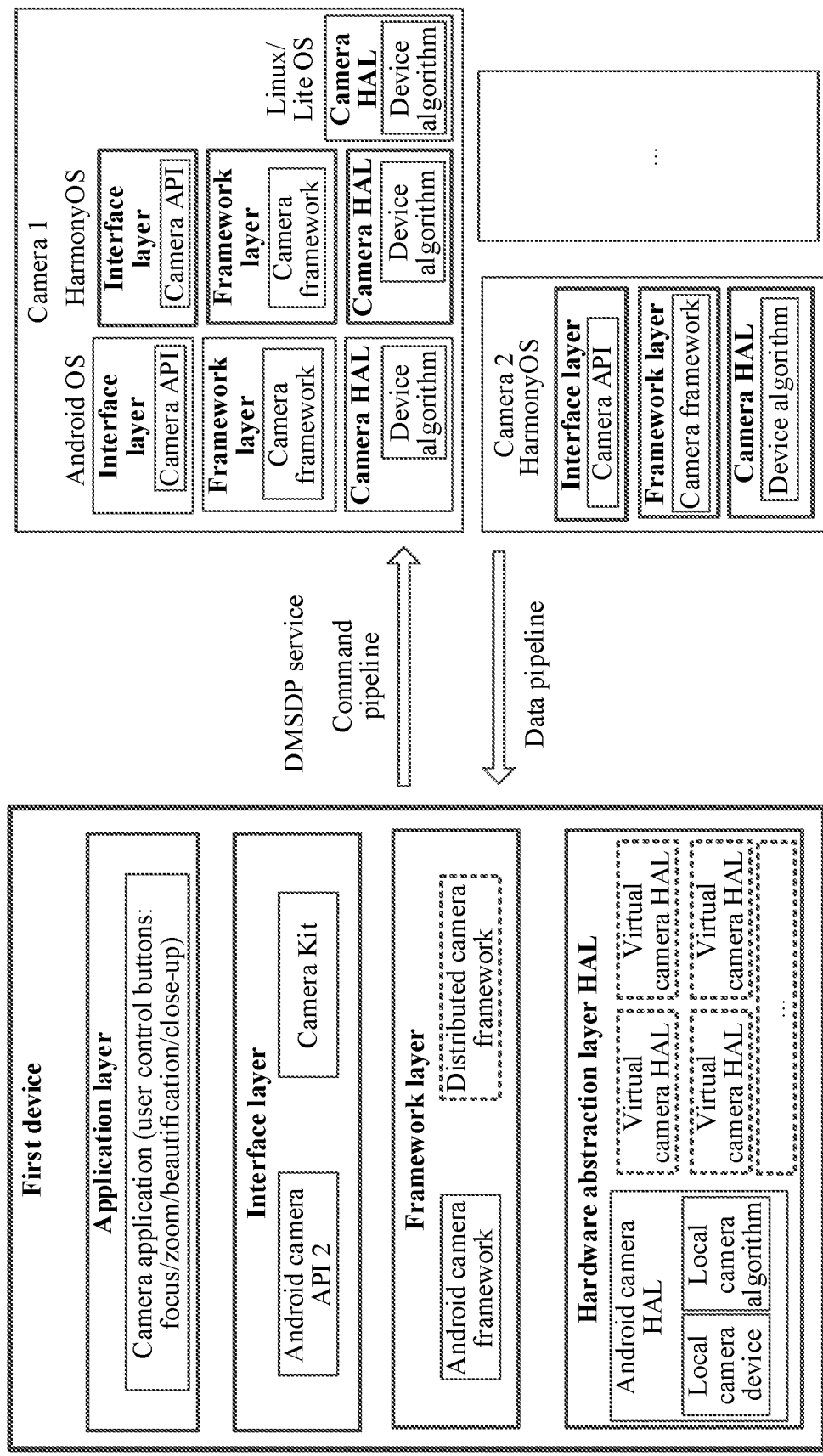
FIG. 8 is a block diagram of a device configuration in an application scenario according to an embodiment of this application.

A communication connection is established between the first device and the second device, and data may be directly transmitted between the first device and the second device. FIG. 8 is a block diagram of a device configuration in an application scenario according to an embodiment of this application. As shown in FIG. 8, in a possible implementation, communication may be established between a first device and a second device by using a DMSDP (English full name: distributed mobile sensing development platform, Chinese full name: distributed mobile sensing development platform) service. Specifically, camera interfaces provided by the DMSDP service between the first device and the second device may be interconnected, so as to establish a cross-device dual-view mode scenario. A command and data may be transmitted between the first device and the second device by using the DMSDP service. The camera interface provided by the DMSDP service may be a CameraKit interface. Camera interface interconnection may be implemented by unifying camera programming interfaces of the first device and the second device as CameraKit interfaces.

After the DMSDP communication is established, the first device and the second device may communicate with each other according to the DMSDP protocol. The DMSDP service may include a command pipeline and a data pipeline. The first device may send a configuration request to the second device by using the DMSDP service, where the configuration request is used for obtaining a hardware parameter of a physical camera of the second device. Specifically, the first device may send the configuration request to the second device through the command pipeline of the DMSDP service.

The second device receives the configuration request, and in response to the configuration request, the second device may send the hardware parameter of the physical camera of the second device to the first device in a form of a standard interface by using the DMSDP service, for example, may send the hardware parameter of the physical camera through the data pipeline of the DMSDP service.

The first device receives the hardware parameter of the physical camera of the second device by using the DMSDP service, obtains the hardware parameter of the physical camera of the second device by reading the standard interface, and locally configures a corresponding virtual camera based on the hardware parameter of the physical camera of the second device. Specifically, the hardware parameter may include a camera capability parameter of the physical camera. The first device may create, based on the camera capability parameter, a virtual camera hardware abstraction layer HAL and a camera framework that correspond to the physical camera, and add the camera framework to a distributed camera framework.

The virtual camera HAL is a hardware abstraction layer for the physical camera of the second device. An HAL is an interface layer between an operating system kernel and a hardware circuit, and manages an interface accessed by each hardware in a form of a module. Each hardware module corresponds to a dynamic link library file. Therefore, a camera HAL is an access interface of a camera. The virtual camera HAL is accessed, and the access is sent, by using the DMSDP service, to the physical camera corresponding to the virtual camera HAL, so that the corresponding physical camera can be accessed.

The camera capability parameter may include an aperture parameter, a focal length parameter, and the like of the camera, and may further include a high dynamic range HDR (High Dynamic Range) capability, a portrait capability, a super nightscape capability, and the like. The virtual camera is created based on the hardware parameter of the physical camera. Metadata of the physical camera can be fully synchronized to ensure that control of the local virtual camera is the same as remote control of the physical camera.

The first device may control, by controlling the virtual camera HAL, the physical camera that corresponds to the virtual camera and that is of the second device. For example, the first device may locally open the virtual camera HAL to turn on the corresponding physical camera of the second device for photographing, and may locally close the virtual camera HAL to turn off the corresponding physical camera of the second device.

In a possible implementation, the first device may locally include one or more virtual camera HALs, and one virtual camera HAL corresponds to a physical camera of one second device. For example, it is assumed that the second device includes more than two physical cameras or the first device is connected to cameras of more than two second devices. In this case, the first device may virtualize the more than two physical cameras to the first device locally, and create corresponding virtual camera HALs. For example, the second device may be a mobile phone, and one virtual camera HAL on the first device corresponds to a plurality of physical cameras (a front-facing camera and a rear-facing camera) on the second device.

In a possible implementation, types of operating systems (Operating Systems, OSs for short) of the first device and the second device are not limited in this application. The first device may use an operating system such as an Android OS, a HarmonyOS, or a Linux OS, and the second device may also use an operating system such as an Android OS, a HarmonyOS, a Linux OS, or a Lite OS.

As shown in FIG. 8, the first device may communicate with a plurality of second devices by using the DMSDP service. A plurality of virtual camera HALs may be configured on the first device. One virtual camera HAL corresponds to a physical camera of one second device. The second device may include one or more physical cameras.

In a possible implementation, as shown in FIG. 8, a distributed camera framework may be further configured on the first device. When receiving the hardware parameter of the physical camera of the second device, the first device may further create a corresponding camera framework, and add the camera framework to the distributed camera framework. The distributed camera framework includes camera frameworks corresponding to a plurality of virtual camera HALs and a control module. The control module may be connected to the plurality of camera frameworks, and is responsible for dynamic pipeline control, device collaboration management, and the like.

The DMSDP service is established between the first device and the second device, and the virtual camera HAL of the physical camera of the second device is locally established on the first device, to simulate real internet service provider (Internet Service Provider, ISP) control, so as to implement cross-device camera commands and data.

Based on the configuration manner of the foregoing implementation of this application, the physical camera of the second device can be quickly controlled, and a camera data stream returned by the physical camera of the second device can be obtained.

Figure 9:
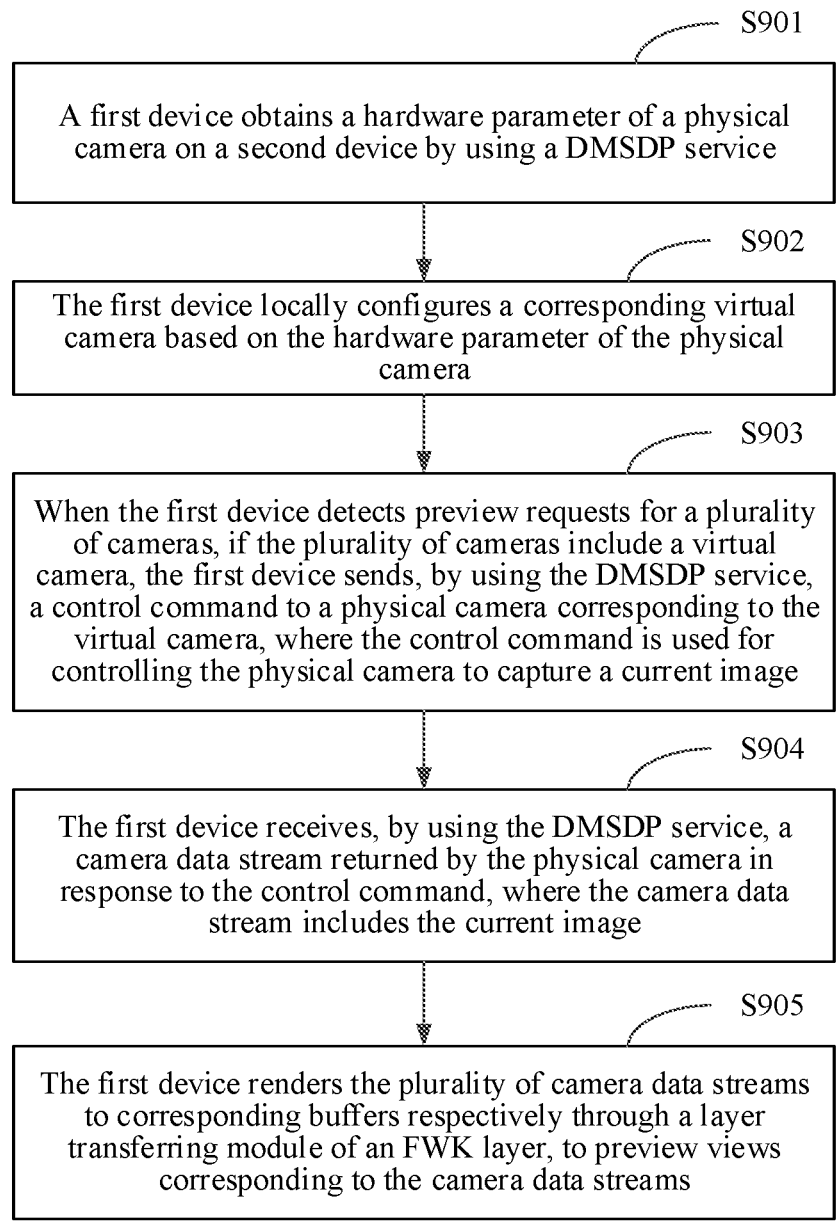
FIG. 9 is a flowchart of a video processing method according to an implementation of this application.

FIG. 9 is a flowchart of a video processing method according to an implementation of this application. When the first device includes a virtual camera HAL, as shown in FIG. 9, the video processing method in this application may further include the following steps.

Step S901: The first device obtains a hardware parameter of a physical camera on the second device by using the DMSDP service.

Step S902: The first device locally configures a corresponding virtual camera based on the hardware parameter of the physical camera.

The hardware parameter may include a camera capability parameter of the physical camera. That the first device locally configures a corresponding virtual camera based on the hardware parameter of the physical camera may include: The first device creates, based on the camera capability parameter, a virtual camera hardware abstraction layer HAL and a camera framework that correspond to the physical camera, and adds the camera framework to a distributed camera framework.

For specific processes of steps S901 and S902, refer to the foregoing descriptions about FIG. 7 and FIG. 8. Details are not described again.

In the implementation shown in FIG. 9, that a first device obtains camera data streams corresponding to a plurality of cameras from an HAL through an FWK layer when detecting preview requests for the plurality of cameras in step S501 may include:

Step S903: When the first device detects the preview requests for the plurality of cameras, if the plurality of cameras include a virtual camera, the first device sends, by using the DMSDP service, a control command to a physical camera corresponding to the virtual camera, where the control command is used for controlling the physical camera to capture a current image.

Step S904: The first device receives, by using the DMSDP service, a camera data stream returned by the physical camera in response to the control command, where the camera data stream includes the current image.

In a possible implementation, as shown in FIG. 8, the first device detects an operation of turning on the camera by using the camera application (camera APK), generates the preview requests, and may deliver the control command to a plurality of virtual camera HALs by using the distributed camera framework, to control, by controlling the plurality of virtual camera HALs, the physical cameras corresponding to the virtual camera HAL. The control command may include processes such as turning-on, photographing, and turning-off of the camera. When receiving the control command, the virtual camera HAL of the first device may send, according to the control command, a control sub-command, for example, a turning-on command or a photographing command, to the physical camera corresponding to the virtual camera HAL.

After creating the virtual camera HAL corresponding to the physical camera, the first device may also create a corresponding virtual camera icon at a local camera application layer. The virtual camera may be an icon of the virtual camera, which is similar to an icon of another application on the first device. The user may control, by tapping the virtual camera icon, the physical camera corresponding to the virtual camera. Therefore, when detecting an operation of tapping the virtual camera icon by the user, the first device may generate the preview requests, deliver the control command to the plurality of virtual camera HALs by using the distributed camera framework, and control, by controlling the plurality of virtual camera HALs, the physical cameras corresponding to the virtual camera HAL.

As shown in FIG. 8, the DMSDP service may include the command pipeline and the data pipeline. The command pipeline is used for transmitting a control command, and the data pipeline is used for transmitting image data. Therefore, the first device may send, through the command pipeline of the DMSDP service, the control command to the physical camera corresponding to the virtual camera.

Figure 10:
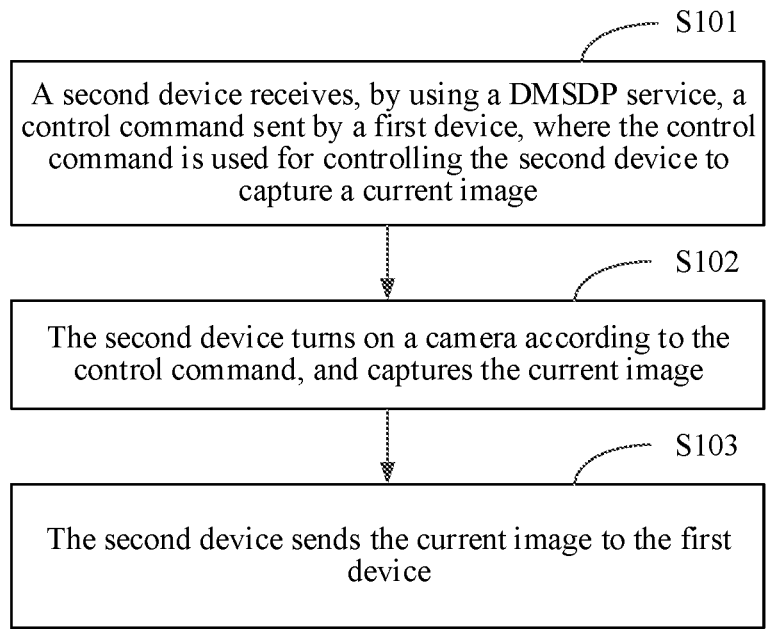
FIG. 10 is a flowchart of an image obtaining method according to an embodiment of this application.

The physical camera of the second device receives the control command by using the DMSDP service, and controls the local physical camera according to the control command. FIG. 10 is a flowchart of an image obtaining method according to an embodiment of this application. As shown in FIG. 10, the method may include the following steps.

Step S101: A second device receives, by using a DMSDP service, a control command sent by a first device, where the control command is used for controlling the second device to capture a current image.

Step S102: The second device turns on a camera according to the control command, and captures the current image.

Step S103: The second device sends the current image to the first device.

As shown in FIG. 8, after receiving the control command by using a DMSDP server, the second device may invoke a camera API (Application Programming Interface, application programming interface) according to the control command, deliver the control command to a camera HAL by using a camera framework, and control operations such as turning-on, photographing, capturing, and turning-off of a physical camera by using the camera HAL.

The second device may send the current image to the first device through a data pipeline of a DMSDP service. Therefore, the first device may receive, through the data pipeline of the DMSDP service, a camera data stream returned by the physical camera in response to the control command. In a possible implementation, the first device may include a plurality of virtual camera HALs, in other words, the first device may obtain camera data streams from a plurality of physical cameras.

The video processing method in this implementation may further include step S905: The first device renders the plurality of camera data streams to corresponding buffers respectively through a layer transferring module of an FWK layer, to preview views corresponding to the camera data streams. For details about step S905, refer to step S502 described above. In this implementation, if the first device detects video recording requests for the plurality of cameras, the method further includes: The first device performs synthesis processing on the camera data streams on the buffers in a background of an APK layer.

In a distributed camera scenario, according to the video processing method in the foregoing implementation of this application, the DMSDP service is established between the first device and the second device, and the virtual camera HAL of the physical camera of the second device is locally established on the first device, to simulate real internet service provider (Internet Service Provider, ISP) control, so as to implement cross-device camera commands and data. Therefore, quick control of a distributed camera may be implemented. The first device carries and displays the camera data streams of the plurality of cameras by using the plurality of views, obtains the plurality of camera data streams from the virtual camera HALs through the FWK layer, and renders, through the layer transferring module of a native layer (the FWK layer), the obtained plurality of camera data streams to the corresponding buffers obtained from a camera APK, so that the plurality of camera data streams are transmitted to the plurality of views of the camera APK, and preview results are generated.

In other words, in the distributed camera framework, a plurality of local cameras are replaced with cameras of remote devices. Local preview requests and recording requests are delivered to the peer device by using the distributed camera framework, and corresponding camera data streams of the peer device are obtained. The camera data streams are carried and displayed by using different surfaceViews, and SurfaceFlinger rendering is performed at the FWK layer, to implement fast preview and recording of a plurality of devices.

Figure 11:
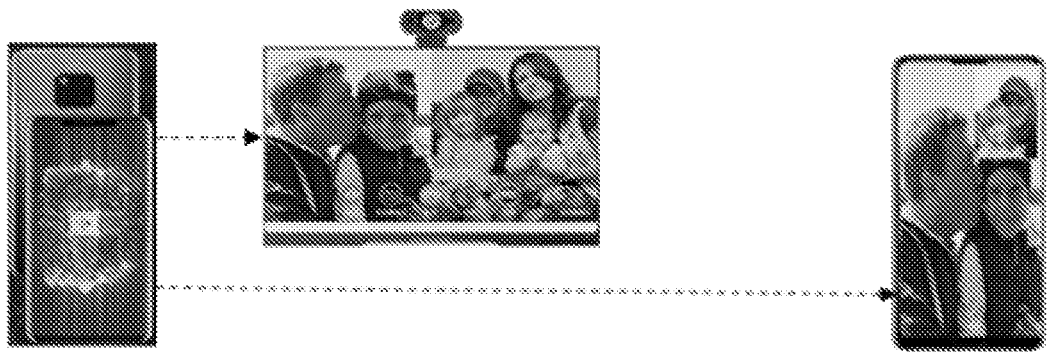
FIG. 11 is a schematic diagram of preview and video recording in a distributed camera scenario according to an embodiment of this application.

FIG. 11 is a schematic diagram of preview and video recording in a distributed camera scenario according to an embodiment of this application. As shown in FIG. 11, a DMSDP service is established between two devices. A device in the middle of FIG. 11 may simultaneously preview, on a display screen, a real-time image collected by a camera of this device and a real-time image collected by a camera of another device (a device on the right side of FIG. 11). Similarly, the device on the right side of FIG. 11 may simultaneously preview, on a display screen, the real-time image collected by the camera of this device and the real-time image collected by the camera of the device in the middle of FIG. 11.

According to the video processing method in the foregoing implementation of this application, quick preview can be implemented when a service or experience is completed under multi-device collaboration, and camera data of a plurality of devices is synchronously recorded. Power consumption of a single device is reduced, and a service scenario is restored more comprehensively. In this manner, a capability of a virtual device is obtained in a multi-device capability query manner, and capabilities of a plurality of physical cameras of the plurality of devices are obtained. Therefore, power consumption of a local device is further reduced.

Figure 12:
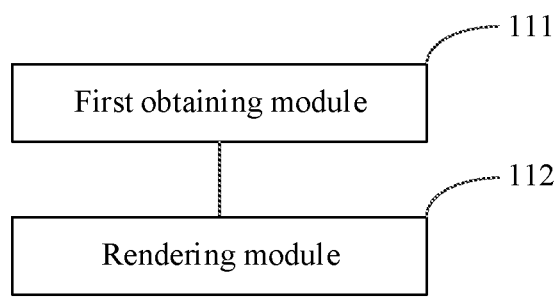
FIG. 12 is a block diagram of a video processing apparatus according to an embodiment of this application.

An embodiment of this application further provides a video processing apparatus. The apparatus is used on a first device. FIG. 12 is a block diagram of a video processing apparatus according to an embodiment of this application. As shown in FIG. 12, the apparatus may include:
  a first obtaining module 111, configured to: when detecting preview requests for a plurality of cameras, create views and buffers that correspond to the plurality of cameras in a camera Android application package APK, deliver the buffers corresponding to the views to a framework FWK layer, and obtain camera data streams corresponding to the plurality of cameras from a hardware abstraction layer HAL through the FWK layer; and
  a rendering module 112, configured to render the plurality of camera data streams to the corresponding buffers respectively through a layer transferring module of the FWK layer, to preview the views corresponding to the camera data streams.

According to the video processing apparatus in this application, when the preview requests for the plurality of cameras are detected, the views and the buffers that correspond to the plurality of cameras are created in the camera APK, the plurality of camera data streams are obtained from the camera HAL through the FWK layer, and the obtained plurality of camera data streams are rendered to the corresponding buffers obtained from the camera APK through the layer transferring module of a native layer (the FWK layer), so that the plurality of camera data streams are transmitted to the plurality of views of the camera APK, so as to rapidly implement multi-camera preview. This is more efficient than a related technology in which a plurality of camera data streams are synthesized and rendered to one view by using OpenGL at an APK layer.

In a possible implementation, the first device includes a virtual camera, and the apparatus further includes:
  a second obtaining module, configured to obtain a hardware parameter of a physical camera on a second device by using a DMSDP service; and
  a configuration module, configured to locally configure a corresponding virtual camera based on the hardware parameter of the physical camera.

In a possible implementation, the hardware parameter includes a camera capability parameter of the physical camera; and
  the configuration module includes:
    a creation unit, configured to: create, based on the camera capability parameter, a virtual camera hardware abstraction layer HAL and a camera framework that correspond to the physical camera, and add the camera framework to a distributed camera framework, where the virtual camera HAL is located at the HAL, and the distributed camera framework is located at the FWK layer.

The DMSDP service is established between the first device and the second device, and the virtual camera HAL of the physical camera of the second device is locally established on the first device, to simulate real internet service provider (Internet Service Provider, ISP) control, so as to implement cross-device camera commands and data. Therefore, quick control of a distributed camera may be implemented.

In a possible implementation, the first obtaining module includes:
  a sending unit, configured to: when detecting the preview requests, if the plurality of cameras include a virtual camera, send, by the first device by using the DMSDP service, a control command to a physical camera corresponding to the virtual camera, where the control command is used for controlling the physical camera to capture a current image; and
  a receiving unit, configured to receive, by using the DMSDP service, a camera data stream returned by the physical camera in response to the control command, where the camera data stream includes the current image.

In a distributed camera scenario, according to the video processing apparatus in the foregoing implementation of this application, the first device undertakes and displays the camera data streams of the plurality of cameras by using the plurality of views, obtains the plurality of camera data streams from the virtual camera HAL through the FWK layer, and renders, through the layer transferring module of the native layer (the FWK layer), the obtained plurality of camera data streams to the corresponding buffers obtained from the camera APK, so that the plurality of camera data streams are transmitted to the plurality of views of the camera APK, and preview results are quickly generated. Quick preview can be implemented when a service or experience is completed under multi-device collaboration, and camera data of a plurality of devices is synchronously recorded. Power consumption of a single device is reduced, and a service scenario is restored more comprehensively. In this manner, a capability of a virtual device is obtained in a multi-device capability query manner, and capabilities of a plurality of physical cameras of the plurality of devices are obtained. Therefore, power consumption of a local device is further reduced.

In a possible implementation, if the first device detects video recording requests for the plurality of cameras, after the rendering module, the apparatus further includes:

a synthesis module, configured to perform synthesis processing on the camera data streams in the plurality of buffers in a background of an APK layer.

According to the video processing apparatus in the foregoing implementation of this application, the camera data streams of the plurality of cameras are carried and displayed by using the plurality of views, the plurality of camera data streams are obtained from the camera HAL through the FWK layer, and the obtained plurality of camera data streams are rendered to the corresponding buffers obtained from the camera APK through the layer transferring module of the native layer (the FWK layer), so that the plurality of camera data streams are transmitted to the plurality of views of the camera APK, video recording synthesis processing is performed on the camera data streams in the plurality of buffers in the background of the APK layer, and a user is unaware of the recording synthesis process. This is more efficient than a conventional technology in which a plurality of camera data streams are synthesized and rendered to one view by using OpenGL at an APK layer.

An embodiment of this application provides a video processing apparatus, including a processor and a memory that is configured to store instructions that can be executed by the processor, where the processor is configured to execute the instructions to implement the foregoing method.

An embodiment of this application provides a non-volatile computer-readable storage medium. The non-volatile computer-readable storage medium stores computer program instructions. When the computer program instructions are executed by a processor, the foregoing method is implemented.

An embodiment of this application provides a computer program product, including computer-readable code or a non-volatile computer-readable storage medium carrying the computer-readable code. When the computer-readable code is run in a processor of an electronic device, the processor of the electronic device performs the foregoing method.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination thereof. More specific examples (a non-exhaustive list) of computer-readable storage media include: a portable computer disk, a hard disk, a random access memory (Random Access Memory, RAM), a read-only memory (Read-Only Memory, ROM), an erasable programmable read-only memory (Electrically Programmable Read-Only-Memory, EPROM, or flash memory), a static random access memory (Static Random Access Memory, SRAM), a portable compact disc read-only memory (Compact Disc Read-Only Memory, CD-ROM), digital versatile disc (Digital Video Disc, DVD), a memory stick, a floppy disk, a mechanical coding device, for example, a punched card or a groove protrusion structure that stores instructions, and any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used for performing operations in this application may be assembly instructions, instruction set architecture (Instruction Set Architecture, ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (Local Area Network, LAN) or a wide area network (Wide Area Network, WAN), or may be connected to an external computer (for example, connected by using an Internet service provider over the Internet). In some embodiments, an electronic circuit, for example, a programmable logic circuit, a field programmable gate array (Field-Programmable Gate Array, FPGA), or a programmable logic array (Programmable Logic Array, PLA), is customized by using status information of computer-readable program instructions. The electronic circuit may execute the computer-readable program instructions, to implement various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device, so that a series of operation steps is performed on the computer, the another programmable data processing apparatus, or the another device to produce a computer-implemented process. Therefore, the instructions executed on the computer, the another programmable data processing apparatus, or the another device implements the functions/acts specified in the one or more blocks in the flowcharts and/or block diagrams.

The flowcharts and the block diagrams in the appended drawings illustrate system architectures, functions, and operations of possible implementations of apparatuses, systems, methods, and computer program products according to a plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may be actually executed substantially in parallel, and may sometimes be executed in a reverse order, depending on a function involved.

It should also be noted that each block in the block diagrams and/or the flowcharts and a combination of blocks in the block diagrams and/or the flowcharts may be implemented by hardware (for example, a circuit or an application-specific integrated circuit (Application-Specific Integrated Circuit, ASIC)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, the disclosed content, and the appended claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a great effect.

Embodiments of this application are described above. The foregoing descriptions are examples, are not exhaustive, and are not limited to the disclosed embodiments. Many modifications and changes are apparent to a person of ordinary skill in the art without departing from the scope and spirit of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. A video processing method, wherein the method is applied to a first device, and the method comprises:
   obtaining, by the first device, a hardware parameter of a physical camera on a second device by using a distributed mobile sensing development platform (DMSDP) service;
   locally configuring, by the first device, a corresponding virtual camera based on the hardware parameter of the physical camera;
   detecting preview requests for a plurality of cameras, the virtual camera has a correspondence with at least one of the plurality of cameras, and in response:
      creating, by the first device, views and buffers that correspond to the plurality of cameras in a camera Android application package (APK),
      identifying buffers corresponding to the views to a framework (FWK) layer,
      obtaining camera data streams corresponding to the plurality of cameras from a hardware abstraction layer (HAL) through the FWK layer;
   rendering, by the first device, the plurality of camera data streams to the corresponding buffers respectively through a layer transferring module of the FWK layer, to preview the views corresponding to the camera data streams;
   wherein the first device detects video recording requests for the plurality of cameras, and after the rendering, by the first device, the plurality of camera data streams to the corresponding buffers, the method further comprises performing synthesis processing on the camera data streams in the plurality of buffers in a background of an APK layer.

2. The method according to claim 1, wherein the hardware parameter comprises a camera capability parameter of the physical camera; and
   the locally configuring, by the first device, the corresponding virtual camera based on the hardware parameter of the physical camera comprises:
   creating, by the first device based on the camera capability parameter, a virtual camera HAL and a camera framework that correspond to the physical camera, and adding the camera framework to a distributed camera framework, wherein
   the virtual camera HAL is located at the HAL, and the distributed camera framework is located at the FWK layer.

3. The method according to claim 2, wherein the obtaining, by the first device, camera data streams corresponding to the plurality of cameras from the HAL through the FWK layer in response to detecting preview requests for the plurality of cameras comprises:
   in response to the first device detecting the preview requests, sending, by the first device by using the DMSDP service, a control command to the physical camera corresponding to the virtual camera, wherein the control command is used for controlling the physical camera to capture a current image; and
   receiving, by the first device by using the DMSDP service, a camera data stream returned by the physical camera in response to the control command, wherein the camera data stream comprises the current image.

4. The method according to claim 2, wherein the first device detects video recording requests for the plurality of cameras, and after the rendering, by the first device, the plurality of camera data streams to the corresponding buffers, the method further comprises:

performing synthesis processing on the camera data streams in the plurality of buffers in a background of an APK layer.

5. The method according to claim 1, wherein the obtaining, by the first device, camera data streams corresponding to the plurality of cameras from the HAL through the FWK layer in response to detecting preview requests for the plurality of cameras comprises:
when the first device detects the preview requests, in response to the plurality of cameras comprising the virtual camera, sending, by the first device by using the DMSDP service, a control command to the physical camera corresponding to the virtual camera, wherein the control command is used for controlling the physical camera to capture a current image; and
receiving, by the first device by using the DMSDP service, a camera data stream returned by the physical camera in response to the control command, wherein the camera data stream comprises the current image.

6. A video processing apparatus, comprising:
a processor; and
a memory, configured to store instructions that can be executed by the processor, wherein
and when the instructions are executed by the processor, the video processing apparatus is enabled to perform the operations:
obtaining, by the first device, a hardware parameter of a physical camera on a second device by using a distributed mobile sensing development platform (DMSDP) service;
locally configuring, by the first device, a corresponding virtual camera based on the hardware parameter of the physical camera;
detecting preview requests for a plurality of cameras, the virtual camera has a correspondence with at least one of the plurality of cameras, and in response:
creating, by the first device, views and buffers that correspond to the plurality of cameras in a camera Android application package (APK),
identifying buffers corresponding to the views to a framework (FWK) layer,
obtaining camera data streams corresponding to the plurality of cameras from a hardware abstraction layer (HAL) through the FWK layer; and
rendering, by the first device, the plurality of camera data streams to the corresponding buffers respectively through a layer transferring module of the FWK layer, to preview the views corresponding to the camera data streams;
if the video processing apparatus detects video recording requests for the plurality of cameras, after the rendering the plurality of camera data streams to the corresponding buffers:
performing synthesis processing on the camera data streams in the plurality of buffers in a background of an APK layer.

7. The video processing apparatus according to claim 6, wherein the hardware parameter comprises a camera capability parameter of the physical camera; and
the locally configuring the corresponding virtual camera based on the hardware parameter of the physical camera comprises:
creating based on the camera capability parameter, a virtual camera HAL and a camera framework that correspond to the physical camera, and adding the camera framework to a distributed camera framework, wherein the virtual camera HAL is located at the HAL, and the distributed camera framework is located at the FWK layer.

8. The video processing apparatus according to claim 7, wherein the obtaining camera data streams corresponding to the plurality of cameras from the HAL through the FWK layer in response to detecting preview requests for the plurality of cameras comprises:
when the first device detects the preview requests, if the plurality of cameras comprise the virtual camera, sending by using the DMSDP service, a control command to the physical camera corresponding to the virtual camera, wherein the control command is used for controlling the physical camera to capture a current image; and
receiving by using the DMSDP service, a camera data stream returned by the physical camera in response to the control command, wherein the camera data stream comprises the current image.

9. The video processing apparatus according to claim 7, wherein when the instructions are executed by the processor, the video processing apparatus is further enabled to perform, if the video processing apparatus detects video recording requests for the plurality of cameras, after the rendering the plurality of camera data streams to the corresponding buffers:
performing synthesis processing on the camera data streams in the plurality of buffers in a background of an APK layer.

10. The video processing apparatus according to claim 6, wherein the obtaining camera data streams corresponding to the plurality of cameras from the HAL through the FWK layer in response to detecting preview requests for the plurality of cameras comprises:
when the first device detects the preview requests, if the plurality of cameras comprise the virtual camera, sending by using the DMSDP service, a control command to the physical camera corresponding to the virtual camera, wherein the control command is used for controlling the physical camera to capture a current image; and
receiving by using the DMSDP service, a camera data stream returned by the physical camera in response to the control command, wherein the camera data stream comprises the current image.

11. A non-transitory non-volatile computer-readable storage medium, wherein the non-volatile computer-readable storage medium stores instructions, and when the instructions are executed by a processor, the processor is enabled to perform the operations:
obtaining, by the first device, a hardware parameter of a physical camera on a second device by using a distributed mobile sensing development platform (DMSDP) service;
locally configuring, by the first device, a corresponding virtual camera based on the hardware parameter of the physical camera;
detecting preview requests for a plurality of cameras, the virtual camera has a correspondence with at least one of the plurality of cameras, and in response:
creating, by the first device, views and buffers that correspond to the plurality of cameras in a camera Android application package (APK),
identifying buffers corresponding to the views to a framework (FWK) layer, obtaining camera data streams corresponding to the plurality of cameras from a hardware abstraction layer (HAL) through the FWK layer; and rendering, by the first device, the plurality of camera data streams to the corresponding buffers respectively through a layer transferring module of the FWK layer, to preview the views corresponding to the camera data streams;

if the processor detects video recording requests for the plurality of cameras, after the rendering the plurality of camera data streams to the corresponding buffers:

performing synthesis processing on the camera data streams in the plurality of buffers in a background of an APK layer.

12. The storage medium according to claim 11, wherein the hardware parameter comprises a camera capability parameter of the physical camera; and the locally configuring the corresponding virtual camera based on the hardware parameter of the physical camera comprises:

creating based on the camera capability parameter, a virtual camera HAL and a camera framework that correspond to the physical camera, and adding the camera framework to a distributed camera framework, wherein the virtual camera HAL is located at the HAL, and the distributed camera framework is located at the FWK layer.

13. The storage medium according to claim 12, wherein the obtaining camera data streams corresponding to the plurality of cameras from the HAL through the FWK layer in response to detecting preview requests for the plurality of cameras comprises:

when the first device detects the preview requests, if the plurality of cameras comprise the virtual camera, sending by using the DMSDP service, a control command to the physical camera corresponding to the virtual camera, wherein the control command is used for controlling the physical camera to capture a current image; and receiving by using the DMSDP service, a camera data stream returned by the physical camera in response to the control command, wherein the camera data stream comprises the current image.

14. The storage medium according to claim 12, wherein when the instructions are executed by the processor, the processor is further enabled to perform, if the video processing apparatus detects video recording requests for the plurality of cameras, after the rendering the plurality of camera data streams to the corresponding buffers:

performing synthesis processing on the camera data streams in the plurality of buffers in a background of an APK layer.

15. The storage medium according to claim 11, wherein the obtaining camera data streams corresponding to the plurality of cameras from the HAL through the FWK layer in response to detecting preview requests for the plurality of cameras comprises:

when the first device detects the preview requests, if the plurality of cameras comprise the virtual camera, sending by using the DMSDP service, a control command to the physical camera corresponding to the virtual camera, wherein the control command is used for controlling the physical camera to capture a current image; and receiving by using the DMSDP service, a camera data stream returned by the physical camera in response to the control command, wherein the camera data stream comprises the current image.

* * * * *